United States Patent
Jung et al.

(10) Patent No.: US 11,392,318 B2
(45) Date of Patent: Jul. 19, 2022

(54) ELECTRONIC DEVICE AND METHOD OF UTILIZING STORAGE SPACE THEREOF

(71) Applicant: SAMSUNG ELECTRONICS CO., LTD., Suwon-si (KR)

(72) Inventors: Wonsuk Jung, Suwon-si (KR); Junwoo Lee, Suwon-si (KR); Jintae Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/891,388

(22) Filed: Jun. 3, 2020

(65) Prior Publication Data

US 2020/0393995 A1    Dec. 17, 2020

(30) Foreign Application Priority Data

Jun. 12, 2019    (KR) .......................... 10-2019-0069161

(51) Int. Cl.
*G06F 3/06*    (2006.01)
*G06F 1/28*    (2006.01)
(Continued)

(52) U.S. Cl.
CPC .............. *G06F 3/0659* (2013.01); *G06F 1/28* (2013.01); *G06F 1/3275* (2013.01);
(Continued)

(58) Field of Classification Search
CPC .... G06F 3/0604; G06F 3/0656; G06F 3/0659; G06F 3/0679; G06F 1/28; G06F 1/3275; G06F 1/3296

See application file for complete search history.

(56) References Cited

U.S. PATENT DOCUMENTS 7,788,427 B1 * 8/2010 Yang ..................... G06F 3/0676
                                                                 710/62
8,037,322 B2 * 10/2011 Yamanaka ............ G06F 1/3287
                                                                 713/300
(Continued)

FOREIGN PATENT DOCUMENTS

| CN | 105786403 | 7/2016 |
|---|---|---|
| CN | 109471596 | 3/2019 |
| WO | 2019108280 | 6/2019 |

OTHER PUBLICATIONS

International Search Repod dated Aug. 28, 2020 in corresponding International Application No. PCT/KR2020/006801.
(Continued)

*Primary Examiner* — Eric T Oberly
(74) *Attorney, Agent, or Firm* — Nixon & Vanderhye, P.C.

(57) ABSTRACT

The various embodiments disclose an electronic device including: a storage including a non-volatile memory having a buffer space and a storage space, a storage device controller, and a storage interface, and a processor. According to various embodiments, the processor may be configured to perform control to determine whether the storage supports a high speed data storage mode using a buffer space of a non-volatile memory of the storage, activate a function of writing data buffered in the buffer space of the non-volatile memory into a storage space of the non-volatile memory based on the storage interface operating in a first state based on the storage supporting the high speed data storage mode, and transition the storage interface of the storage to the first state based on no request to the storage being generated during a predetermined time period based on the storage interface operating in a second state.

32 Claims, 12 Drawing Sheets

(51) Int. Cl.
  *G06F 1/3234* (2019.01)
  *G06F 1/3296* (2019.01)
(52) U.S. Cl.
  CPC .......... *G06F 1/3296* (2013.01); *G06F 3/0604* (2013.01); *G06F 3/0656* (2013.01); *G06F 3/0679* (2013.01)

(56) References Cited

U.S. PATENT DOCUMENTS

| | | |
|---|---|---|
| 2004/0160931 A1 | 8/2004 | Lee et al. |
| 2006/0063536 A1 | 3/2006 | Kim et al. |
| 2006/0245249 A1 | 11/2006 | Hwang |
| 2007/0002631 A1 | 1/2007 | Kang et al. |
| 2007/0038808 A1 | 2/2007 | Yim et al. |
| 2007/0168604 A1 | 7/2007 | Takai et al. |
| 2007/0286212 A1 | 12/2007 | Kim et al. |
| 2007/0287411 A1 | 12/2007 | Kim et al. |
| 2008/0077728 A1 | 3/2008 | Kim et al. |
| 2008/0077729 A1 | 3/2008 | Kim et al. |
| 2008/0104309 A1 | 5/2008 | Cheon et al. |
| 2008/0126680 A1 | 5/2008 | Lee et al. |
| 2008/0159012 A1 | 7/2008 | Kim |
| 2008/0172520 A1 | 7/2008 | Lee |
| 2008/0175058 A1 | 7/2008 | Kang |
| 2008/0189478 A1 | 8/2008 | Chae et al. |
| 2008/0285340 A1 | 11/2008 | Song et al. |
| 2008/0304323 A1 | 12/2008 | Cho et al. |
| 2008/0320064 A1 | 12/2008 | Park et al. |
| 2009/0027971 A1 | 1/2009 | Song et al. |
| 2009/0049234 A1 | 2/2009 | Oh et al. |
| 2009/0055579 A1 | 2/2009 | Park et al. |
| 2009/0144501 A2 | 6/2009 | Yim et al. |
| 2009/0225600 A1 | 9/2009 | Park |
| 2010/0115192 A1 | 5/2010 | Lee |
| 2010/0125699 A1 | 5/2010 | Kong et al. |
| 2010/0153630 A1 | 6/2010 | Yim et al. |
| 2010/0153631 A1 | 6/2010 | Moon et al. |
| 2010/0153632 A1 | 6/2010 | Lee et al. |
| 2010/0262757 A1 | 10/2010 | Sprinkle et al. |
| 2010/0262759 A1 | 10/2010 | Borchers et al. |
| 2011/0080785 A1 | 4/2011 | Kim |
| 2011/0138115 A1 | 6/2011 | Oh et al. |
| 2011/0208896 A1 | 8/2011 | Wakrat et al. |
| 2011/0219180 A1 | 9/2011 | Cheon et al. |
| 2011/0231595 A1 | 9/2011 | Wakrat et al. |
| 2011/0276857 A1 | 11/2011 | Kim et al. |
| 2012/0005415 A1 | 1/2012 | Jung et al. |
| 2012/0047409 A1 | 2/2012 | Post et al. |
| 2012/0079173 A1 | 3/2012 | Chae et al. |
| 2012/0089766 A1 | 4/2012 | Yu et al. |
| 2012/0115464 A1 | 5/2012 | Jang |
| 2012/0134348 A1 | 5/2012 | Kim |
| 2012/0157124 A1 | 6/2012 | Kim et al. |
| 2012/0159054 A1 | 6/2012 | Cheon et al. |
| 2012/0246391 A1 | 9/2012 | Meir et al. |
| 2012/0290897 A1 | 11/2012 | Yoon et al. |
| 2013/0003455 A1 | 1/2013 | Chae et al. |
| 2013/0042058 A1 | 2/2013 | Oh et al. |
| 2013/0046920 A1 | 2/2013 | Ryu et al. |
| 2013/0088928 A1 | 4/2013 | Kwak |
| 2013/0094293 A1 | 4/2013 | Seol et al. |
| 2013/0103892 A1 | 4/2013 | Park et al. |
| 2013/0103913 A1 | 4/2013 | Seol et al. |
| 2013/0114338 A1 | 5/2013 | Park et al. |
| 2013/0117500 A1 | 5/2013 | Joo et al. |
| 2013/0117620 A1 | 5/2013 | Joo et al. |
| 2013/0121059 A1 | 5/2013 | Kim et al. |
| 2013/0132645 A1 | 5/2013 | Danilak et al. |
| 2013/0148429 A1 | 6/2013 | Kim et al. |
| 2013/0173857 A1 | 7/2013 | Cheon et al. |
| 2013/0238833 A1 | 9/2013 | Vogan et al. |
| 2013/0294166 A1 | 11/2013 | Ha |
| 2013/0304966 A1 | 11/2013 | Joo |
| 2014/0019673 A1 | 1/2014 | Wakrat et al. |
| 2014/0037086 A1 | 2/2014 | Seol et al. |
| 2014/0045543 A1* | 2/2014 | Ishii .................... H04W 52/146 455/522 |
| 2014/0047172 A1 | 2/2014 | Sprinkle et al. |
| 2014/0071753 A1 | 3/2014 | Shin |
| 2014/0141797 A1 | 5/2014 | Kim et al. |
| 2014/0208019 A1* | 7/2014 | Wu ..................... G06F 12/0888 711/113 |
| 2014/0229663 A1 | 8/2014 | Yang et al. |
| 2014/0244903 A1 | 8/2014 | Yano et al. |
| 2014/0281771 A1 | 9/2014 | Yoon et al. |
| 2014/0325095 A1 | 10/2014 | Kang et al. |
| 2014/0379970 A1 | 12/2014 | Cheon et al. |
| 2015/0052299 A1 | 2/2015 | Mirichigni et al. |
| 2015/0074490 A1 | 3/2015 | Kondo |
| 2015/0099543 A1 | 4/2015 | Kim et al. |
| 2015/0103599 A1 | 4/2015 | Kim et al. |
| 2015/0131375 A1 | 5/2015 | Kwak et al. |
| 2015/0139081 A1* | 5/2015 | Chan ................. H04W 72/1268 370/329 |
| 2015/0160999 A1 | 6/2015 | Seo et al. |
| 2015/0178224 A1 | 6/2015 | Seo et al. |
| 2015/0221063 A1 | 8/2015 | Kim et al. |
| 2015/0248244 A1 | 9/2015 | Seo et al. |
| 2015/0261667 A1 | 9/2015 | Oh et al. |
| 2015/0293713 A1 | 10/2015 | Seo et al. |
| 2015/0370491 A1 | 12/2015 | Cheon et al. |
| 2016/0103478 A1 | 4/2016 | Nakanishi et al. |
| 2016/0124647 A1 | 5/2016 | Kim |
| 2016/0141026 A1 | 5/2016 | Lee |
| 2016/0179430 A1 | 6/2016 | Kong et al. |
| 2016/0203075 A1* | 7/2016 | Shin ........................ G11C 16/10 711/103 |
| 2016/0231941 A1 | 8/2016 | Oh et al. |
| 2016/0268000 A1 | 9/2016 | Thompson et al. |
| 2016/0284393 A1 | 9/2016 | Ramalingam |
| 2017/0024278 A1 | 1/2017 | Twitto et al. |
| 2017/0090947 A1 | 3/2017 | Lee et al. |
| 2017/0115914 A1 | 4/2017 | Byun |
| 2017/0161202 A1 | 6/2017 | Erez et al. |
| 2017/0168754 A1 | 6/2017 | Lai et al. |
| 2017/0177235 A1 | 6/2017 | Nishikubo et al. |
| 2017/0235941 A1 | 8/2017 | Kim et al. |
| 2017/0277245 A1 | 9/2017 | Paley et al. |
| 2017/0285967 A1 | 10/2017 | Pandurangan et al. |
| 2017/0300413 A1* | 10/2017 | Mirichigni .............. G06F 13/00 |
| 2018/0032275 A1 | 2/2018 | Pahwa et al. |
| 2018/0040368 A1 | 2/2018 | Shim et al. |
| 2018/0081594 A1 | 3/2018 | Jung et al. |
| 2018/0121131 A1 | 5/2018 | Vogan et al. |
| 2018/0253376 A1 | 9/2018 | Nishikubo et al. |
| 2018/0373440 A1 | 12/2018 | Shah |
| 2018/0373642 A1 | 12/2018 | Yang et al. |
| 2019/0035478 A1 | 1/2019 | Lee et al. |
| 2019/0042140 A1 | 2/2019 | Natarajan et al. |
| 2019/0042444 A1* | 2/2019 | Natarajan ............ G06F 12/0246 |
| 2019/0095116 A1* | 3/2019 | Igahara ................ G06F 3/0619 |
| 2019/0163252 A1 | 5/2019 | Phoenix |
| 2021/0227168 A1* | 7/2021 | Inada ..................... H04N 5/361 |

OTHER PUBLICATIONS

European Search Report and Written Opinion dated Oct. 30, 2020 in corresponding European Application No. 20179543.2.
First Office Action dated Oct. 11, 2021 in counterpart Chinese Application No. 202010493211.9 and English-language translation.
Notification of Fulfilling of Registration Formality dated Feb. 16, 2022 in Chinese Patent Application No. 202010493211.9 and English-language translation.

* cited by examiner

ELECTRONIC DEVICE AND METHOD OF UTILIZING STORAGE SPACE THEREOF

CROSS-REFERENCE TO RELATED APPLICATION

This application is based on and claims priority under 35 U.S.C. § 119 to Korean Patent Application No. 10-2019-0069161 filed on Jun. 12, 2019, in the Korean Intellectual Property Office, the disclosure of which is incorporated by reference herein in its entirety.

BACKGROUND

Field

The disclosure relates to an electronic device and a method of utilizing storage space thereof and, for example, to an electronic device that is capable of writing data in its storage in a high speed data storage mode and a method of utilizing the storage space thereof.

Description of Related Art

In order for a portable terminal to store a large volume of data, it is preferable to use a high density data storage scheme.

Although the high density data storage scheme makes it possible for an electronic device to store a larger volume of data in its storage in comparison with a low density data storage scheme, it may have a drawback of a relatively slow data storage speed. Meanwhile, recent advances in high speed data transfer technologies are spurring development of a technology for storing transferred data fast.

Data writing speed may be improved in a high speed data storage mode in which part of a storage space is assigned as a buffer space such that data are buffered in the buffer space in a low density data storage mode and then written in the storage space in a high density data storage mode. In the case where the storage autonomously performs the operation of writing the data buffered in the buffer space into the storage space, a processor of the electronic device cannot check a progress status of the writing operation and electric current consumption caused by the writing operation, which leads to performance degradation of the electronic device.

In the case where the operation of writing the data buffered in the buffer space into the storage space in the high density data storage mode is performed with a specific size of the buffer space, the writing operation is suspended until the specific size of the buffer space is secured, which results in reduction of available capacities of the buffer space and storage space of the storage.

If the operation of writing the data buffered in the buffer space into the storage space in the high density data storage mode is performed in the middle of storing data in response to a new data writing input/output request, this may degrade the performance of processing the new data writing input/output request.

SUMMARY

Embodiments of the disclosure provide an electronic device capable of protecting against performance degradation of the electronic device and increasing the available capacity of buffer space at a time point desired by a processor of the electronic device in such a way of enabling the processor to set a time point to write data buffered in buffer space into storage space in a high density data storage mode, which allows the processor to check for the information on progress of the writing operation and electric current consumption caused by the writing operation.

Embodiments of the disclosure further provide an electronic device capable of increasing available capacities of buffer space and storage space for writing data in a high density data storage mode in such a way of enabling the operation of writing the data buffered in the buffer space into the storage space in the high density data storage mode to be performed while a storage interface is operating in a sleep mode or in the middle of processing a procedure for the electronic device to enter a power saving mode.

Embodiments of the disclosure also provide an electronic device capable of preventing and/or reducing an operation of writing data into storage space from degrading performance of processing a new data writing input/output request in such a way of enabling the operation of writing the data buffered in the buffer space into the storage space in the high density data storage mode to be performed while a storage interface is operating in a sleep mode or in the middle of processing a procedure for the electronic device to enter a power saving mode.

According to various example embodiments, an electronic device may include: a storage including a non-volatile memory having a buffer space and a storage space, a storage device controller, and a storage interface, and a processor configured to perform control to: determine whether the storage supports a high speed data storage mode using a buffer space of a non-volatile memory of the storage, activate a function of writing data buffered in the buffer space of the non-volatile memory into a storage space of the non-volatile memory based on the storage interface operating in a first state based on the storage supporting the high speed data storage mode, and transition the storage interface of the storage to the first state based on no request to the storage being generated during a predetermined time period during which the storage interface is operating in a second state.

According to various example embodiments, a storage control method of an electronic device may include: determining whether a storage supports a high speed data storage mode using a buffer space of a non-volatile memory of the storage, activating a function of writing data buffered in the buffer space of the non-volatile memory into a storage space of the non-volatile memory based on a storage interface operating in a first state based on the storage supporting the high speed data storage mode, and transitioning the storage interface of the storage to the first state based on no request to the storage being generated during a predetermined time period during which the storage interface is operating in a second state.

According to various example embodiments, an electronic device may include: a storage including a non-volatile memory having a buffer space and a storage space, a storage device controller, and a storage interface, a touchscreen, a communication circuit, and a processor configured to perform control to: execute power saving operations for components of the electronic device, the components including the touchscreen, the communication circuit, and the storage, in order for the electronic device to enter a power saving mode, determine whether the storage supports a high speed data storage mode based on initiation of the power saving operation for the storage among the power saving operations for the components of the electronic device, identify available capacity of the buffer space for the high speed data storage mode in the non-volatile memory based on the storage supporting the high speed data storage mode, set a time period for the storage to write the data buffered in the buffer space of the non-volatile memory into the storage space of the non-volatile buffer memory based on the available capacity of the buffer space, and write the data buffered in the buffer space of the non-volatile memory of the storage into the storage space during the time period.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
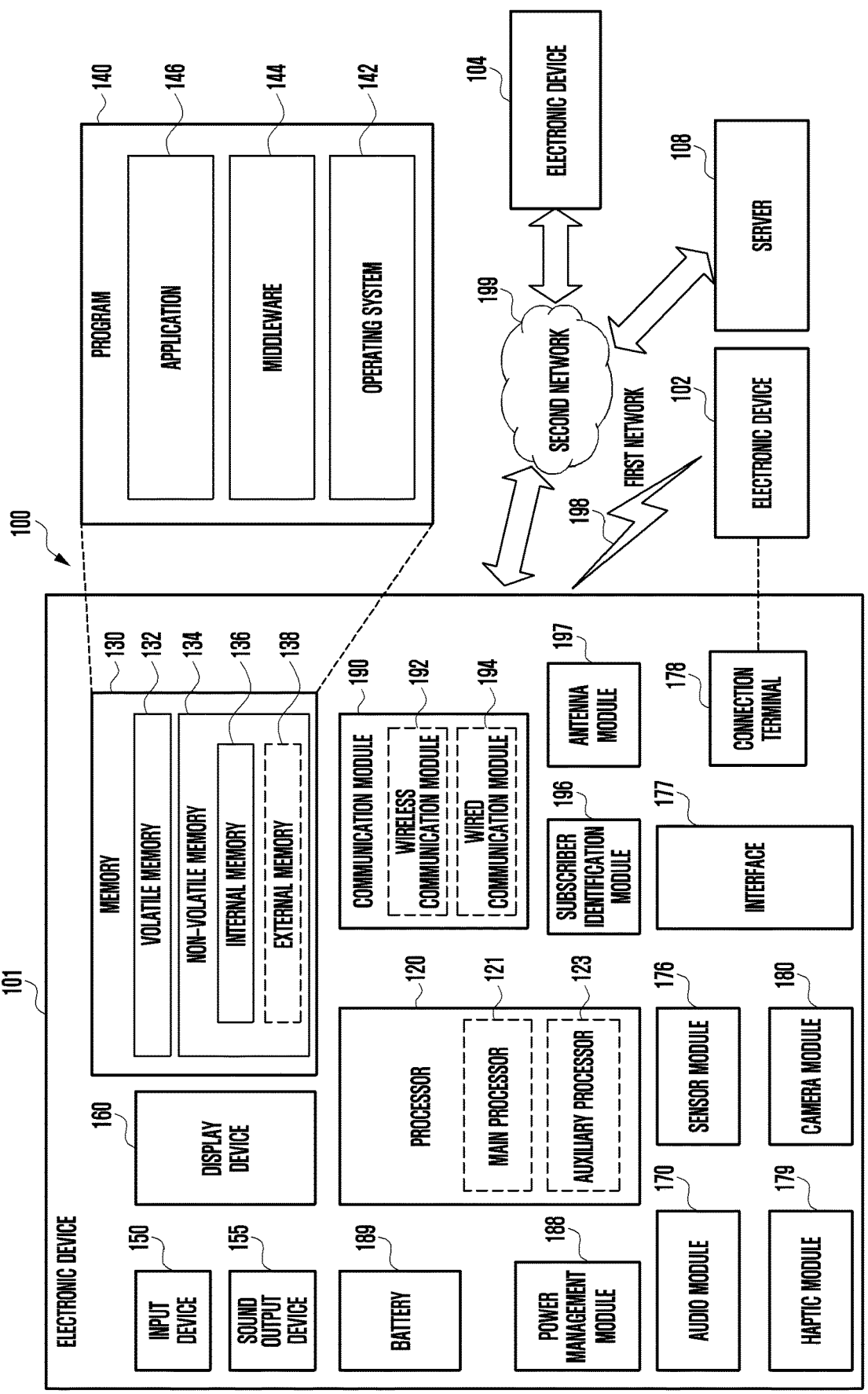
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
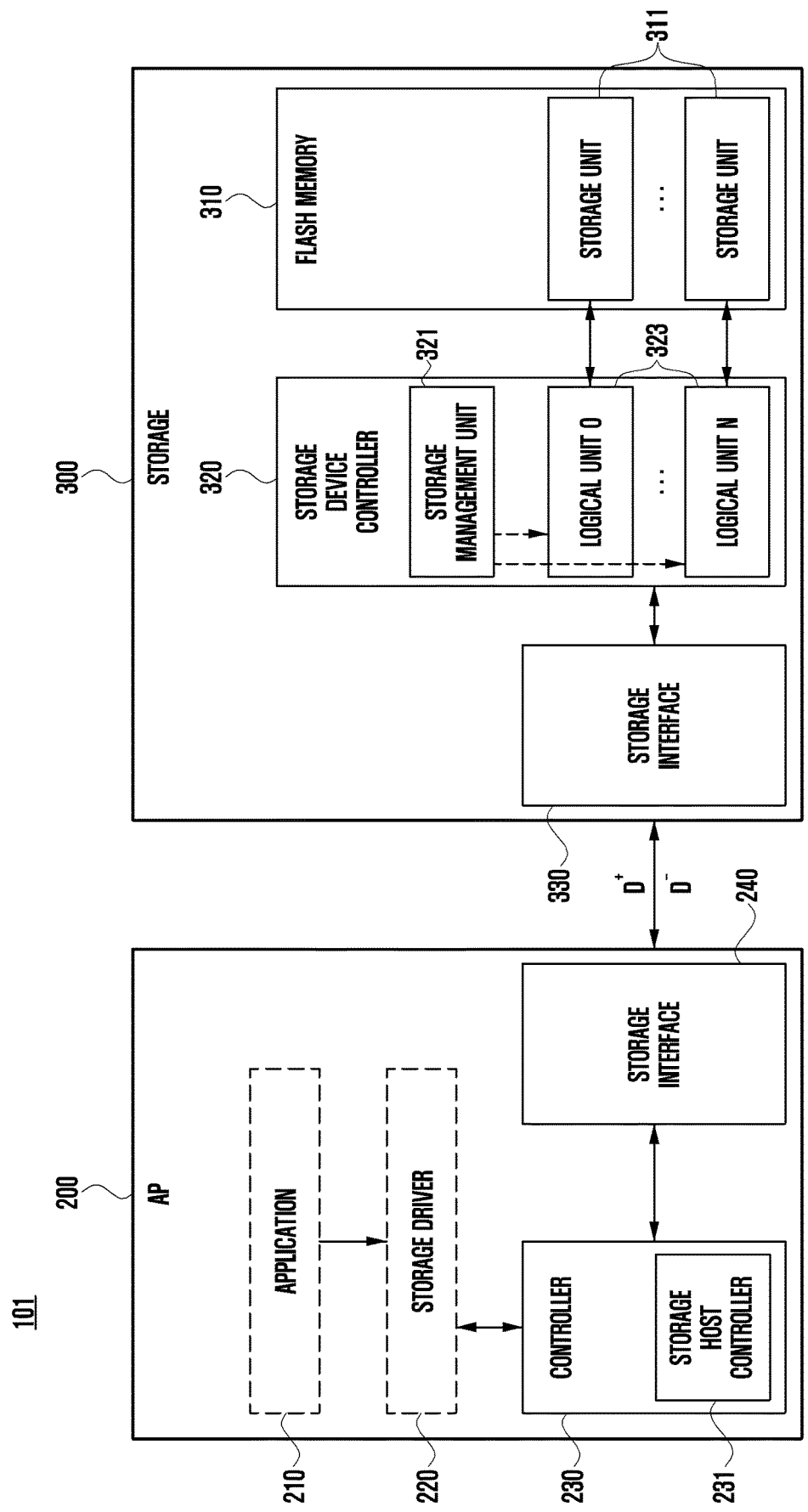
FIG. 2 is a block diagram illustrating an example architecture of an electronic device according to various embodiments.

FIG. 2 is a block diagram illustrating an example architecture of an electronic device according to various embodiments.

Referring to FIG. 2, the electronic device 101 may include an application processor (AP) (e.g., including processing circuitry) 200 (e.g., processor 120 in FIG. 1) and a storage 300 (e.g., memory 130 in FIG. 1). The electronic device 101 may be configured by omitting or replacing some of the components depicted in FIG. 2 according to various disclosed embodiments. According to various embodiments, the electronic device 101 may further include a battery (not shown) (e.g., battery 189 in FIG. 1) and/or a power management module (not shown) (e.g., power management module 188 in FIG. 1). According to various embodiments, the electronic device may further include at least one of a camera (e.g., camera module 180 in FIG. 1), a liquid crystal display (LCD) (e.g., display device 160 in FIG. 1), a speaker (e.g., sound output device 155 in FIG. 1), a touchscreen (e.g., display device 160 in FIG. 1), a communication circuit (e.g., communication module 190 in FIG. 1), a universal serial bus (USB) (e.g., connection terminal 178 in FIG. 1), or the like.

According to various embodiments, the application processor 200 may control the individual components of the electronic device and/or perform communication-related operations or data processing, and it may include at least part of the configuration and/or functions of the processor 120 of FIG. 1. For example, the processor may be operationally connected with the components of the electronic device 101.

According to various embodiments, a component controlling the storage 300 via the application processor 200 may be referred to as host. According to various embodiments, the host may include an environment in which the software including the application processor and an operating system operate. For example, the host may be a system on chip (SoC) including functions of a chipset responsible for execution of various applications and graphic processing on the electronic device 101.

According to various embodiments, the application processor 200 may include an application 210, a storage driver 220, a controller 230, and/or a storage interface 240. The components depicted with a dotted line such as the application 210 and the storage driver 220 may be software programs.

According to various embodiments, the controller 230 may include various circuitry and control other components of the application processor 200 and/or perform a communication-related operation or data processing. According to various embodiments, the controller 230 may include controllers for controlling corresponding components of the electronic device 102. For example, the controller 230 may include a storage host controller 231 for controlling operations of the storage 300. For example, the controller 230 may include a PMIC interface controller (e.g., PMIC interface controller 233 in FIG. 5) for controlling operations of a PMIC (e.g., PMIC 500 in FIG. 5).

According to various embodiments, the controller 230 may transfer various control commands to the storage 300 via the storage interface 240 of the application processor 200. For example, the storage host controller 231 of the controller 230 may receive a data storage request generated by the application 210 via the storage driver 220 and send a data writing input/output request to the storage 300 via the storage interface 240 in response to the data storage request. According to various embodiments, the storage interface 240 of the application processor 200 may include various link-interfaces for providing data link functionality. According to various embodiments, the storage interface 240 of the application processor 200 may include, for example, and without limitation, an MIPI M-PHY interface, an MIPI unipro interface defined by the mobile industry processor interface (MIPI) alliance, or the like. For example, the application processor 200 may perform high speed data communication with the storage 300 via the MIPI M-PHY interface or MIPI unipro interface.

According to various embodiments, the storage 300 may store various kinds of data being used by at least one of the components of the electronic device 101 (e.g., application processor 200). According to various embodiments, the storage 300 may include a flash memory 310, a storage device controller 320, and/or a storage interface 330.

According to various embodiments, the flash memory 310 may include a non-volatile memory (e.g., non-volatile memory 134 in FIG. 1) by way of example. For example, the flash memory 310 may include a NAND flash memory 310 that complies with the universal flash storage (UFS) standard. According to various embodiments, the storage device controller 320 may control the components of the storage 300 and/or perform communication-related operations and data processing. According to various embodiments, the storage device controller 320 may receive various kinds of control commands from the application processor 200 via the storage interface 330 of the storage 300. For example, the storage device controller 320 may receive a data request including a data write request (data write I/O), a data read request (data read I/O), or a data delete request (data delete I/O) from the application processor 200 via the storage interface 330 of the storage 300. According to various embodiments, the storage interface 330 of the storage 300 may include various kinds of link interfaces for providing data link functionality. According to various embodiments, the storage interface 330 of the storage 300 may include, for example, and without limitation, an MIPI M-PHY interface, MIPI unipro interface defined by the MIPI Alliance, or the like.

According to various embodiments, the storage management unit 321 of the storage device controller 320 may establish and control at least one logical unit 323. For example, the at least one logical unit 323 may correspond to at least one storage unit 311 of the flash memory 310 to store corresponding data.

Figure 3:
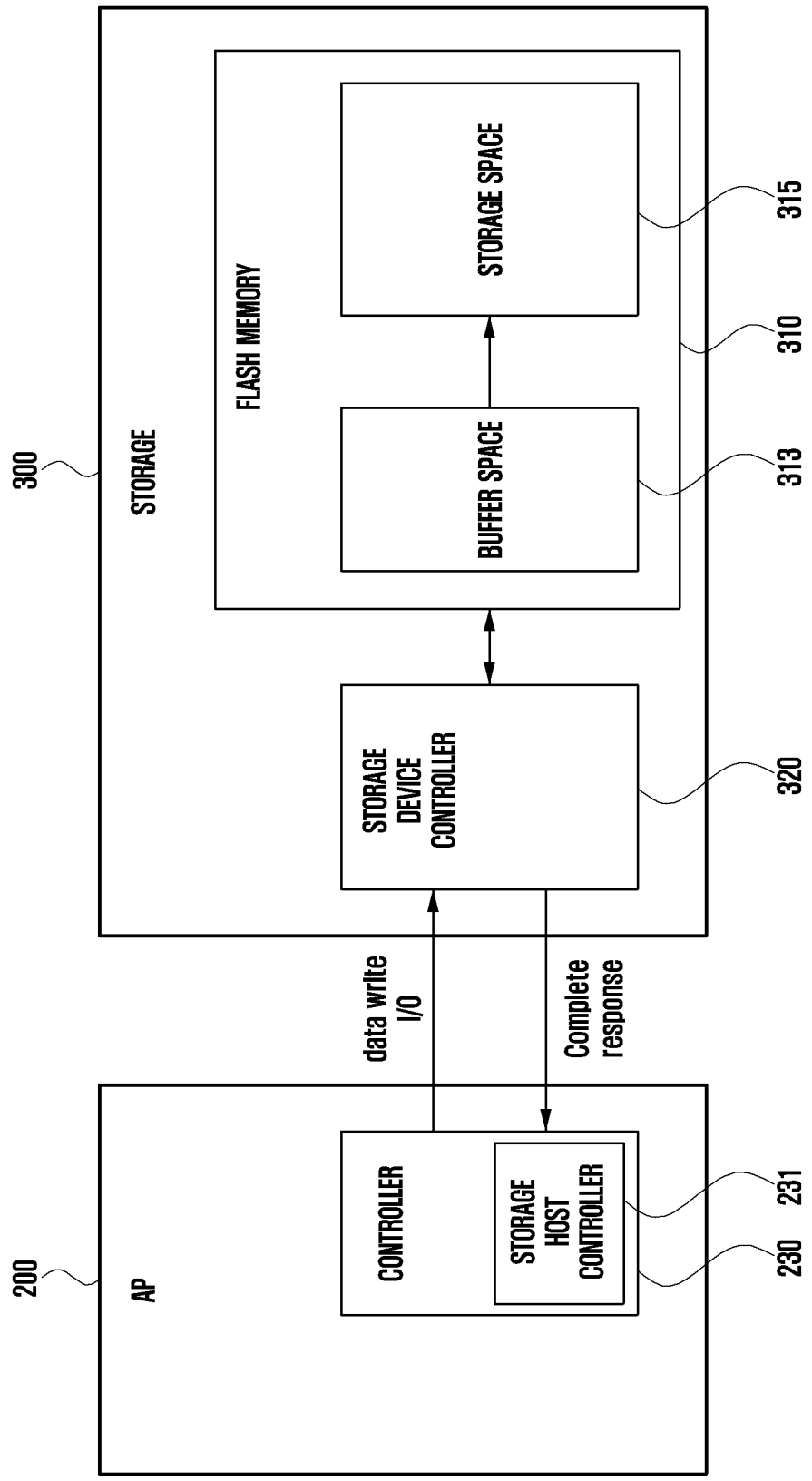
FIG. 3 is a diagram illustrating an example procedure for an electronic device to store data in a high density data storage mode according to various embodiments.

FIG. 3 is a diagram illustrating an example procedure for an electronic device to store data in a high density data storage mode according to various embodiments.

Referring to FIG. 3, the flash memory 310 of the storage 300 may operate in a data storage mode that differs in accordance with a number of data bits that can be stored in a cell. For example, the flash memory 310 may operate in a single level cell (SLC) mode for storing 1-bit data in a cell, a multi-level cell (MLC) mode for storing 2-bit data in a cell, a triple-level cell (TLC) mode for storing 3-bit data in a cell, or a quad-level cell (QLC) mode for storing 4-bit data in a cell. In the case of operating in the MLC, TLC, or QLC modes, the flash memory 310 may store data with a density higher than that in the SLC mode and write the data at a speed slower than that in the SLC mode. Although the following description is directed to the case where the flash memory stores data in the TLC mode for convenience of explanation, it will be apparent to those skilled in the art that the MLC or QLC mode may also be employed in the various disclosed embodiments.

According to various embodiments, the flash memory 310 may switch between two storage modes. For example, the flash memory 310 operating in the TLC mode in which data are relatively slowly written may temporarily switch the storage mode to the SLC mode to write the data at a relatively fast speed (hereinafter, referred to as high speed data storage mode).

According to various embodiments, it may be possible to improve storage speed (or writing speed) of the flash memory 310 operating in the TLC mode by employing the high speed data storage mode. For example, the high speed data storage mode can be implemented in such a way of buffering data to be stored in the flash memory 310 in buffer space 313 of the flash memory 310 in the SLC mode and proceeding to write the data in storage space 315 of the flash memory 310 in the TLC mode. The flash memory 310 may assign a predetermined size of its empty space (e.g., space filled with no data) as the buffer space 313 to buffer the data in the SLC mode and write the data in the storage space 315 of the flash memory 310 in the TLC mode. The data written in the storage space 315 may be deleted from the buffer space 313. For example, the data being received from the application processor 200 is first written in the high-speed writable buffer space 313 having a predetermined size, which is borrowed from the empty space of the flash memory 310, in the SLC mode and then secondarily rewritten in the storage space 315 of the flash memory 310 in the TLC mode. Because the operation of rewriting the data in the TLC mode is an intra-memory operation that is transparent to the application processor 200, a perception of a user is likely to be that the storage speed is improved. According to various embodiments, the high speed data storage mode may include the universal flash storage (UFS) 3.1 turbo write mode of the joint electron device engineering council (JEDEC) standard. The operation of writing the data buffered in the buffer space 313 of the flash memory 310 may be a flush operation (or migration operation) of the UFS 3.1 turbo write mode.

According to various embodiments, the application processor 200 may send a data write input/output (I/O) or memory write I/O (hereinafter, referred to as "write request") for storing data to the storage 300 via the storage host controller 231 of the controller 230.

According to various embodiments, the storage device controller 320 of the storage 300 may control the flash memory 310 to buffer the data in the buffer space 313 upon receipt of the data write request from the application processor 200. For example, the storage device controller 320 may write the data in the buffer space 313 of the flash memory 310 in the SLC mode.

According to various embodiments, the storage may perform a flush operation as an operation of rewriting the data buffered in the buffer space 313 of the flash memory 310 into the storage space 315 of the flash memory 310 under the control of the storage device controller 320. For example, the storage 300 may write at least part of the data buffered in the buffer space 313 of the flash memory 310 into the storage space 315 of the flash memory 310 in the TLC mode (or MLC or QLC mode) and delete the data written in the storage space 315 from the buffer space 313. Although the buffer space 313 and the storage space 315 are distinguished from each other in the flash memory 310 for convenience of explanation, the buffer and storage spaces are simply distinguished logically in a physically identical (mixed) storage space.

According to various embodiments, the storage 300 may send the application processor 200 a response signal indicating that the data has been completely stored.

In the case where the storage 300 performs the flush operation autonomously, the application processor 200 cannot check a progress status of the flush operation and electric current consumption caused by the data rewriting operation, which may lead to performance degradation of the electronic device 101.

Figure 4:
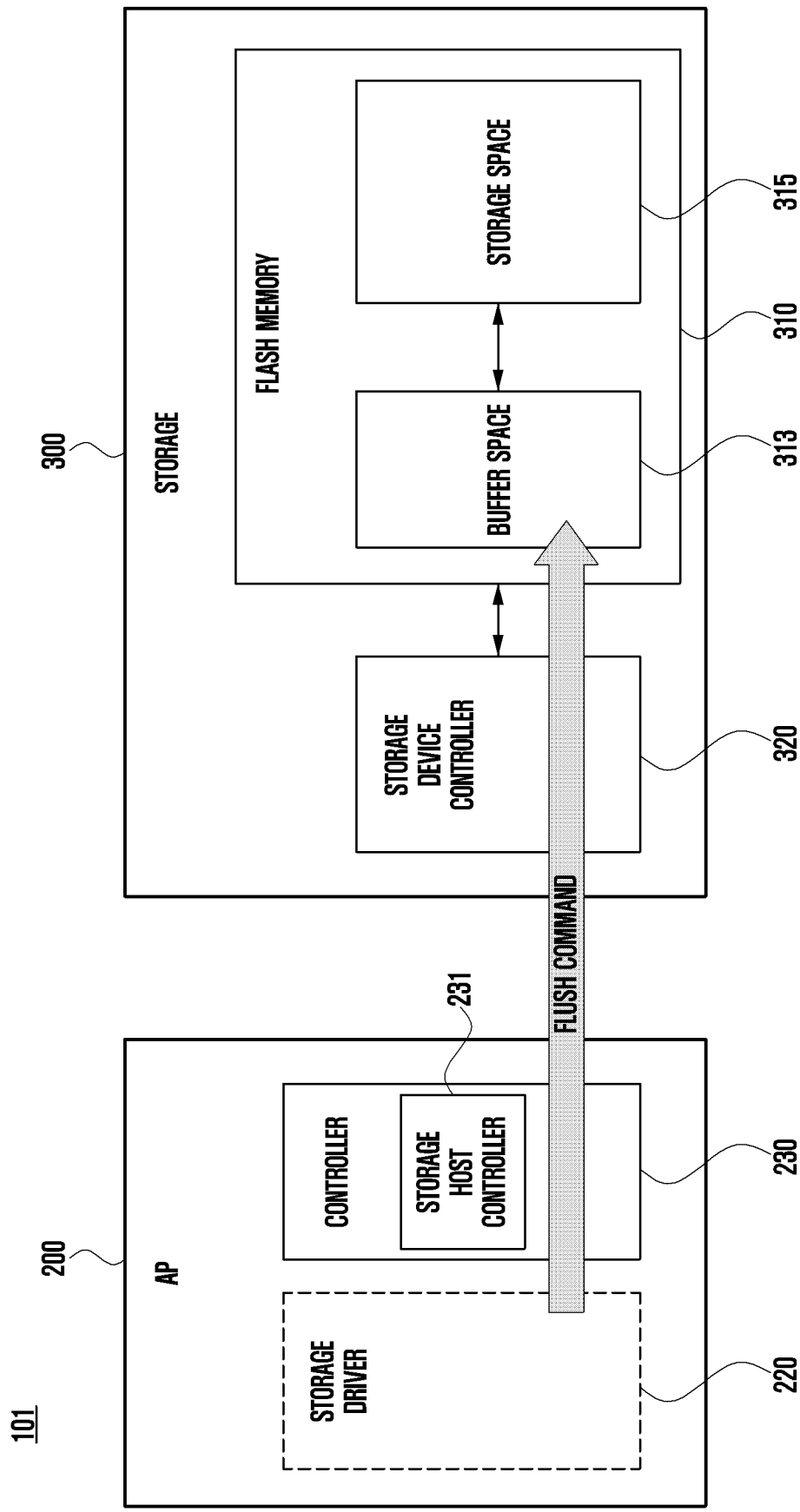
FIG. 4 is a diagram illustrating an example flush procedure of an electronic device operating in a high speed data storage mode using a low density data storage scheme and a high density data storage scheme in a stepwise manner according to various embodiments.

FIG. 4 is a diagram illustrating an example flush procedure of an electronic device operating in a high speed data storage mode, using a low density data storage scheme and a high density data storage scheme in a stepwise manner, according to various embodiments.

Referring to FIG. 4, the application processor 200 may send the storage 300 a control command providing instructions for activation of a flush operation function or performance of a flush operation during a predetermined time period. According to various embodiments, the storage 300 may perform the flush operation based on the control command.

According to various embodiments, the application processor 200 may control the storage 300 to perform the flush operation of the flash memory 310 while the storage interface 240 (see, e.g., FIG. 2) of the application processor 200 is in the sleep mode. According to various embodiments, the storage interface 240 of the application processor 200 and the storage interface 330 of the storage 300 may operate in the same operation state under the control of the application processor 200. For example, the application processor 200 may control the storage interface 240 of the application processor 200 and the storage interface 330 (see, e.g., FIG. 2) of the storage 300 to operate in the sleep mode. According to various embodiments, the storage interface 330 of the storage 300 may operate in one of various operation states. According to various embodiments, the storage interface may operate in one of various operation states corresponding to those of the link interface. For example, the storage interface 330 may operate, for example, in one of various unipro states defined by the MIPI Alliance.

According to various embodiments, if a data request (such as a new data write request, a data read request, and a data delete request) is not generated to the storage 300 during a predetermined time period (e.g., 10 ms), the application processor 200 may send the storage a control command providing instructions for entering a first state. Upon receipt of the control command, the storage interface 330 may enter the first state. For example, the first state of the storage interface 330 may, for example, be a hibernate state among the unipro states defined by the MIPI Alliance. For example, the hibernate state of the storage interface 330 is a state in which the storage interface 330 is operating in the sleep mode.

According to various embodiments, if a data write request for storing data in the storage 300 is received from the application processor 200, the storage interface 330 enters a second state in which a data write operation is performed in response to the data write request received from the application processor 200. For example, the second state of the storage interface 330 may, for example, be a linkup state among the unipro states defined by the MIPI Alliance. The electric current being consumed in the hibernate state (e.g., below 1 mA) is one a few hundredths of the electric current being consumed in processing the data write request in the linkup state (e.g., 300 mA~500 mA).

According to various embodiments, the storage 300 may perform the flush operation of the flash memory 310 while the storage interface 330 is operating in the first state. For example, the flush operation may be performed in such a way of writing the data buffered in the buffer space 313 of the flash memory 310 into the storage space 315 of the flash memory 310. For example, the flush operation may include a data relocation operation being performed in such a way of writing at least part of the data stored in the buffer space 313 into the storage space 315 and deleting the data written into the storage space 315 from the buffer space 313. In order for the flash memory 310 to perform the flush operation while the storage interface 330 is operating in the first state, the flash memory 310 should be supplied with power during the flush operation.

According to various embodiments, the application processor 200 may control the storage 300 to activate a function of performing the flush operation while the storage interface 330 of the storage 300 is operating in the first state. Upon activation of the function, the storage 300 may perform the flush operation of the flash memory 310 whenever the storage interface 330 is in the first state. For example, the storage 300 may perform the flush operation of the flash memory 310 during a time period from entering the first state until waking up from the first state. According to various embodiments, the application processor 200 may control the power management module to supply power from a battery to the flash memory 310 during the flush operation of the flash memory 310 that is performed while the storage interface 330 is in the first state.

According to various embodiments, if the new data write request is generated, the application processor 200 may send the storage 300 a control command providing instructions for a transition from the first state to the second state. For example, upon receipt of the control command, the storage 300 may stop the flush operation and control the storage interface to transition from the first state to the second state. For example, the storage 300 may control the storage interface 330 to enter the second state in a predetermined time (e.g., 5 ms) after the receipt of the control command to prevent processing of the new data write request from being delayed.

According to various embodiments, the storage 300 may determine whether the function of performing the flush operation of the flash memory 310 is activated while the storage interface 330 is operating in the first state whenever the storage interface 330 enters the first state. According to various embodiments, the storage 300 may perform the flush operation of the flash memory 310 upon activation of the corresponding function while the storage interface 330 is operating in the first state.

According to various embodiments, the application processor 200 may control the storage 300 such that the flash memory 310 stops the flush operation and the storage interface enters the second state upon generation of the new data write request during the flush operation of the flash memory 310 of the storage 300.

According to various embodiments, the application processor 200 may determine whether part of the storage space 315 of the flash memory 310 is assigned as the buffer space 313 for buffering data in the SLC mode to verify whether the storage 300 supports the high speed data storage mode.

According to various embodiments, the application processor 200 may initialize the flash memory 310 of the storage 300 upon detection of power-on of the electronic device and determine whether the storage 300 supports the high speed data storage mode exploiting (e.g., using) the buffer space 313 of the flash memory upon detection of completion of initialization of the flash memory 310. According to various embodiments, the application processor 200 may initialize at least part of settings of the storage 300 upon detection of a transition of the electronic device 101 from a power saving mode to a normal mode (e.g., resuming or wakeup) (or exiting from the power saving mode of the electronic device 101) and determine whether the storage 300 supports the high speed data storage mode exploiting (e.g., using) the buffer space 313 of the flash memory 310 upon detection of completion of the initialization.

According to various embodiments, in the case where the flush operation of the flash memory 310 is performed in the first state (e.g., hibernate state) where no data write request is generated, the flush operation is not overlapped with any data write request processing operation, which may refer, for example, to no delay in processing the data write request and makes it possible to secure time for performing the flush operation, leading to an increase in the capacity available for the buffer space 313 of the flash memory 310.

According to various embodiments, the application processor 200 may control the storage 300 to perform the flush operation of the flash memory 310 when the electronic device 101 performs a power saving operation for the storage during a procedure for entering the power saving mode. The procedure for entering the power saving mode of the electronic device 101 may include a procedure for performing power saving tasks for individual components (e.g., touchscreen and communication circuit) of the electronic device 101 in a predetermined order in order for the electronic device 101 to enter the power saving mode.

According to various embodiments, if there is no task to perform, the electronic device 101 may power off the display screen to enter the power saving mode (e.g., suspended mode or sleep mode). For example, if there is no input signal during a predetermined time period or a power-off button is pushed to turn off the touchscreen, the electronic device 101 may initiate the procedure for entering the power saving mode. If a new task is created (e.g., if a power button is pushed to turn on the display or a message is received) in the course of the procedure for entering the power saving mode, the electronic device 101 may stop the power saving mode entry procedure and wake up.

According to various embodiments, the procedure for the electronic device 101 to enter the power saving mode may include power saving operations for the individual components (e.g., camera, storage 300, touchscreen, speaker, and communication module) that are operationally connected with the application processor 200. Examples of the power saving operations for the components may include the operations of turning off the powers and clocks to the corresponding components and other subordinate operations. After completing the power saving operations for all of the components that are operationally connected with the application processor 200, the application processor 200 may also perform its own power saving operation to complete the power saving mode entry procedure of the electronic device 101. In the state where at least one of the power saving operations of the power saving mode entry procedure is incomplete, the electronic device 101 cannot enter the power saving mode and has to resume the power saving mode entry procedure all over again.

According to various embodiments, upon detection of initiation of the power saving operation for the storage 300 in the power saving mode entry procedure in which the power saving operations for the individual components (e.g., touchscreen and communication circuit) of the electronic device 101 are performed in order, the application processor 200 may determine whether the storage 300 supports the high speed data storage mode. The power saving operation for the storage 300 may be performed via the storage driver 220 of the application processor 200.

According to various embodiments, if it is determined that the storage 300 supports the high speed data storage mode, the application processor 200 may check the available capacity of the buffer space 313 of the flash memory 310. For example, the buffer space 313 of the flash memory 310 may be a temporary storage space in which data are stored in the SLC mode.

According to various embodiments, the application processor 200 may set a time period for performing the flush operation of the flash memory 310 based on the available capacity of the buffer space 313. According to various embodiments, the application processor 200 may determine whether to terminate the power saving operation for the storage 300 based on the available capacity of the buffer space 313.

According to various embodiments, if it is determined that the available capacity of the buffer space 313 of the flash memory 310 is equal to or less than a first threshold (e.g., equal to or below 30% of the total amount of the buffer space 313), the application processor 200 may determine to control the storage 300 to perform the flush operation during a first time period (e.g., 500 ms). For example, assuming that the electronic device 101 terminates and resumes the power saving mode entry procedure, the first time period may refer, for example, to the maximum time period for the flush operation without affecting the operation of resuming the power saving mode entry procedure. According to various embodiments, the application processor 200 may perform control to stop the power saving operation for the storage (without being completed) and resume the power saving mode entry procedure of the electronic device 101 after the storage 300 has performed the flush operation of the flash memory 310 during the first time period.

According to various embodiments, if it is determined that the available capacity of the buffer space 313 of the flash memory 310 is greater than the first threshold and equal to or less than a second threshold (e.g. above 30% and equal to or below 80% of the total capacity of the buffer space 313), the application processor 200 may determine to control the storage 300 to perform the flush operation during a second time period (e.g., 200 ms). The second time period may be shorter than the first time period. According to various embodiments, the application processor 200 may complete the power saving operation for the storage 300 after the expiry of the second time period, e.g., after the storage 300 performs the flush operation of the flash memory 310 during the second time period. The application processor 200 may perform the power saving operations for other components (e.g., display and camera) of the electronic device 101 for completing the power saving mode entry procedure of the electronic device 101.

According to various embodiments, if it is determined that the available capacity of the buffer space 313 of the flash memory 310 is greater than the second threshold (e.g., above 80% of the total capacity of the buffer space 313), the application processor 200 may determine to control the storage 300 to suspend the flush operation (set the time period for the flush operation to 0) and complete the power saving operation for the storage 300 immediately. The application processor 200 may perform the power saving operations for other components of the electronic device 101 that have not been performed yet.

According to various embodiments, the application processor 200 may control the power management module to supply power from the battery to the flash memory 310 while the storage 300 is performing the flush operation of the flash memory 310.

According to various embodiments, the application processor 200 may perform control such that a data request including a new data write request, a data read request, or a data delete request is not sent to the storage 300 while the storage 300 is performing the flush operation of the flash memory 310.

According to various embodiments, upon detection of a new task generated in the electronic device 101 while the storage 300 is performing the flush operation of the flash memory 310, the application processor 200 may control the storage 300 to stop the flush operation of the flash memory 310 and resume the power saving mode entry procedure of the electronic device 101 without completing the power saving operation for the storage 300.

According to various embodiments, if it is determined that an additional flush operation is necessary after completing the flush operation of the flash memory 310 during a predetermined time period in the course of performing the power saving operation for the storage 300 among the power saving operations for the components (e.g., touchscreen and communication circuit) of the electronic device 101 in the power saving mode, a standby mode entry procedure may be resumed without completion of the power saving operations, which makes it possible for the storage 300 to perform the flush operation of the flash memory 313 repetitively. According to various embodiments, the application processor 200 is capable of controlling the storage 300 to perform the flush operation of the flash memory 310 repetitively before the electronic device 101 enters the standby mode, which leads to an increase of the available capacity of the buffer space 313 of the flash memory 310.

Figure 5:
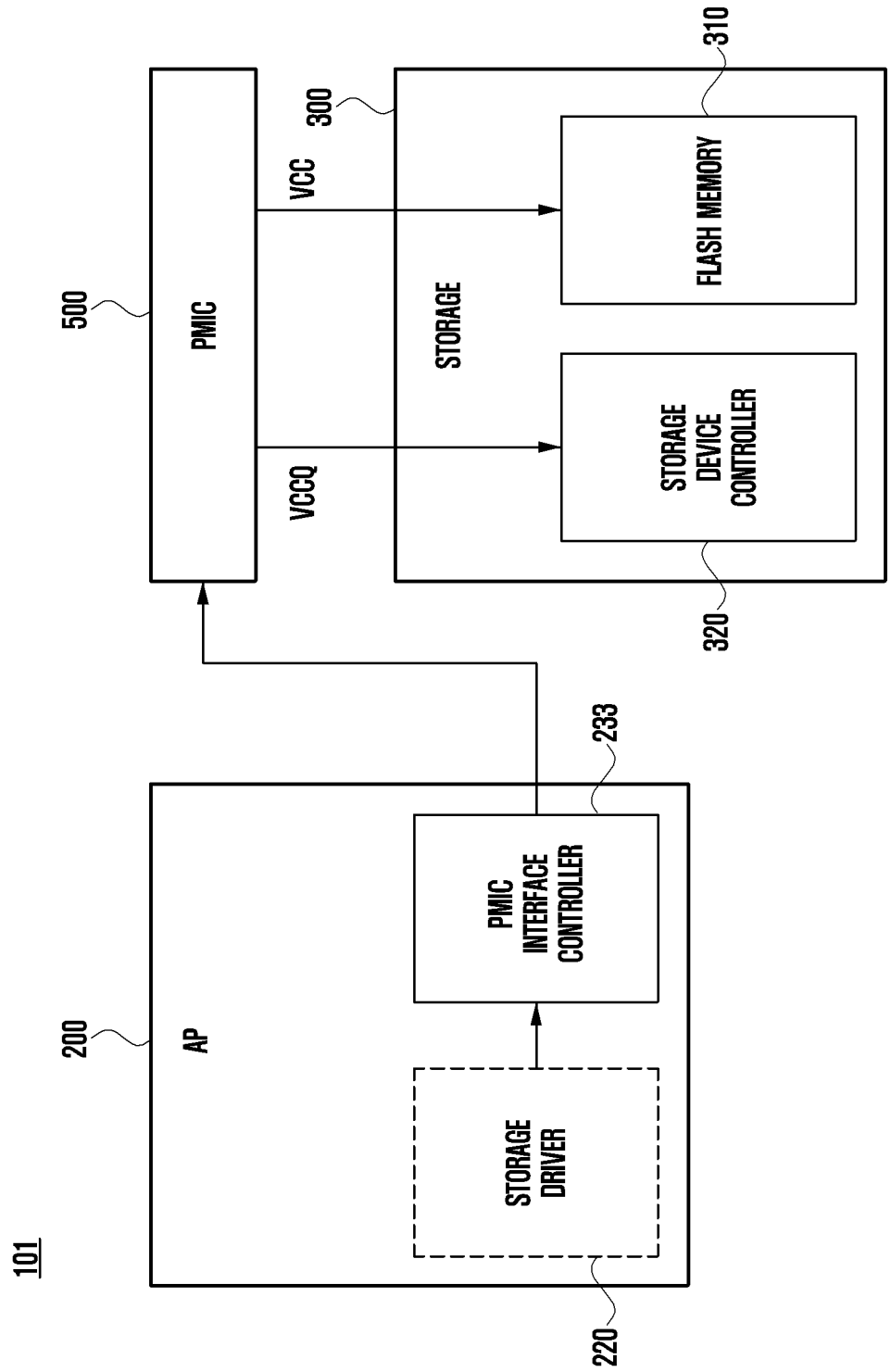
FIG. 5 is a block diagram illustrating an example configuration of an electronic device according to various embodiments.

FIG. 5 is a block diagram illustrating an example configuration of an electronic device according to various embodiments.

Referring to FIG. 5, the electronic device 101 may further include a power management module (power management integrated circuit (PMIC)) 500 (e.g., power management module 188 in FIG. 1) and a battery (not shown) (e.g., battery 189 in FIG. 1).

According to various embodiments, the power management module 500 may manage power supply to the components of the electronic device 101 under the control of the application processor 200. According to various embodiments, the battery may supply power to the components of the electronic device 101.

According to various embodiments, the power management module 500 may manage power (e.g., VCCQ and VCC) being supplied to the storage device controller 320 and the flash memory 310 of the storage 300.

According to various embodiments, the application processor 200 may send the PMIC 500 a power supply control command. For example, the storage driver 220 may send the PMIC 500 the power supply control command via a PMIC interface controller 233 of the controller 230. According to various embodiments, the PMIC interface controller 233 may be a component included in the controller 230 of FIG. 2.

According to various embodiments, in the case where the storage interface 330 of the storage 300 is in the first state (e.g., hibernate state), the PMIC 500 may supply power to the storage device controller 320 under the control of the application processor 200. According to various embodiments, in the case where the storage interface 330 of the storage 300 is in the first state, the PMIC 500 may supply or may not supply power to the flash memory 310.

According to various embodiments, in the case where the storage 300 performs the flush operation of the flash memory 310 while the storage interface 330 is in the first state, the PMIC 500 may supply power to the flash memory 310. For example, in the case where the storage 300 activates a function of performing the flush operation of the flash memory 310 while the storage interface 330 is in the first state, the PMIC 500 may continue supplying power to the flash memory 310 even when the storage interface 330 is in the first state.

Figure 6:
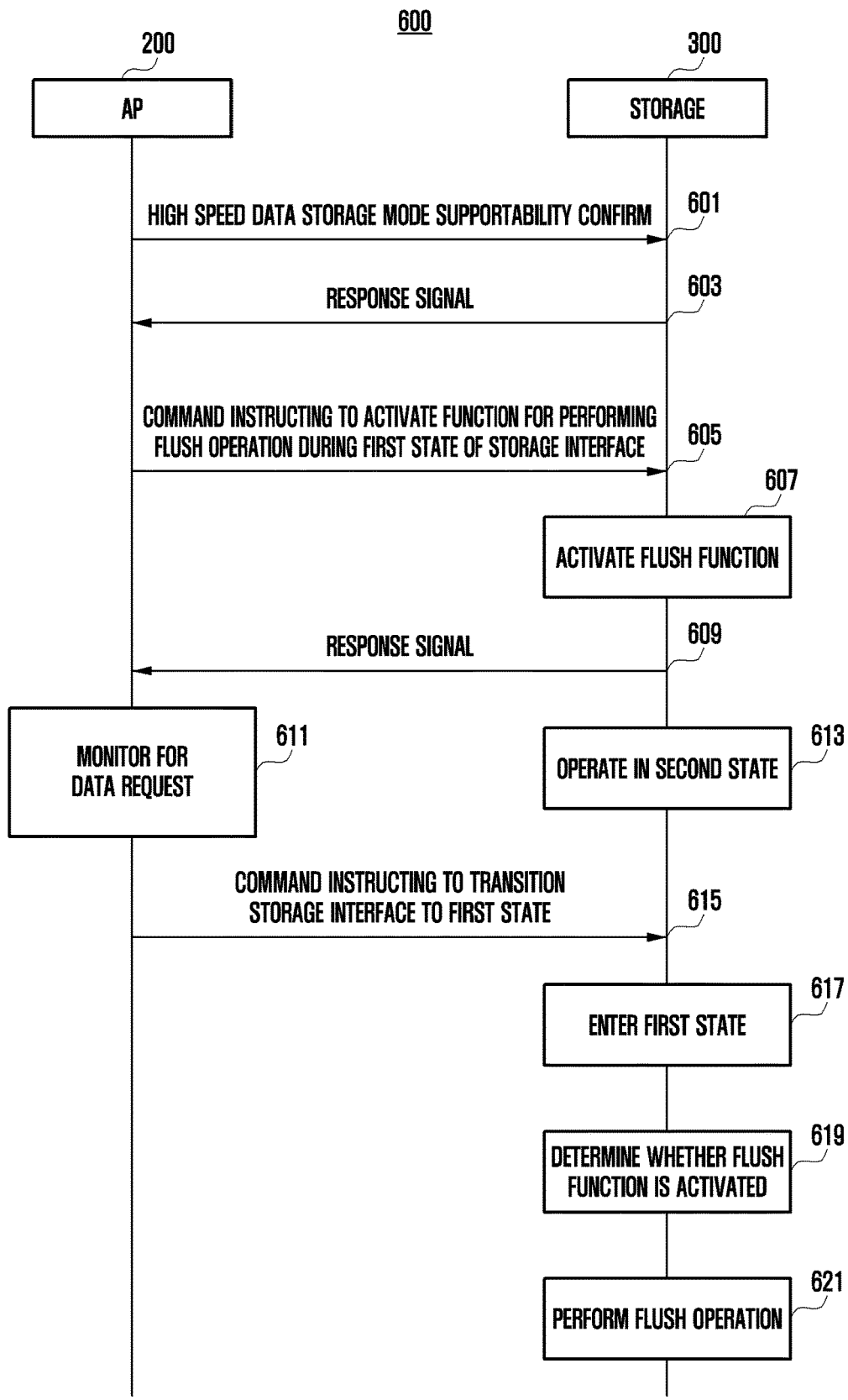
FIG. 6 is a signal flow diagram illustrating example signal flows between an application processor and a storage in an electronic device according to various embodiments.

FIG. 6 is a signal flow diagram illustrating example signal flows between an application processor and a storage in an electronic device according to various embodiments.

Referring to the signal flow diagram 600 of FIG. 6, the application processor 200 may confirm at operation 601 whether the storage 300 supports a high speed data storage mode. For example, the application processor 200 may confirm whether the flash memory 310 of the storage 300 has the buffer space 313 assigned for the high speed data storage mode.

According to various embodiments, the application processor 200 may determine whether the storage 300 supports the high speed data storage mode when the electronic device 101 powers on or transitions from the power saving mode to the normal mode (e.g., resumes, wakes up, or exits from the power saving mode). According to various embodiments, the application processor 200 may initialize at least part of settings of the storage 300, when the electronic device 101 powers on or exits from the power saving mode, and determine whether the storage 300 supports the high speed data storage mode for use of the buffer space 313 of the flash memory upon detection on the completion of the initialization of the storage 300.

According to various embodiments, the storage 300 may send, at operation 603, the application processor 200 a response signal indicating whether the storage 300 supports the high speed data storage mode. For example, if some of the storage space 315 of the flash memory 310 of the storage 300 is assigned as the buffer space 313 for the high speed data storage mode, the storage 300 may send the application processor 200 the response signal including information indicating that it supports the high speed data storage mode.

According to various embodiments, the application processor 200 may send, at operation 605, the storage 300 a control command providing instructions for activation of a function for the storage 300 to perform the flush operation of the flash memory based on the high speed data storage mode being supported in the storage 300. For example, the flush operation may be performed in such a way of writing at least part of the data, which have been buffered in the buffer space 313 of the flash memory 310 in the SLC mode, into the storage space 315 of the flash memory 310 in the TLC mode and deleting the data written into the storage space 315 from the buffer space 313 of the flash memory 310 in the storage 300.

According to various embodiments, the application processor 200 may send the storage 300 a control command for the storage 300 to perform the flush operation of the flash memory 310 while the storage interface 330 of the storage is operating in the first state, when the electronic device 101 powers on or transitions from the power saving mode to the normal mode (e.g., resumes, wakes up, or exits from the power saving mode).

According to various embodiments, the storage 300 may activate, at operation 607, the function of performing the flush operation of the flash memory 310 while the storage interface 330 is operating in the first state upon receipt of the control command. For example, the first state of the storage interface 330 may be a state in which the storage interface 330 is operating in the sleep mode. For example, the first state may be the hibernate state defined by the MIPI Alliance.

According to various embodiments, the storage 300 may send, at operation 609, the application processor 200 a response signal including information indicative of the activation of the function of performing the flush operation of the flash memory 310 while the storage interface 330 is operating in the first state. According to various embodiments, operation 609 may be omitted.

According to various embodiments, the application processor 200 may monitor, at operation 611, for occurrence of a data request (e.g., data write request, data read request, or data delete request) to be sent to the storage 300. For example, the application processor 200 may periodically check for a number of newly-occurring data write requests.

According to various embodiments, the storage 300 may let the storage interface 300 operate in the second state at operation 613. For example, the storage interface 330 may be in the state allowing the storage 300 to receive the data write request from the application processor 200 and perform a data write operation. The second state may be the linkup state defined by the MIPI Alliance.

According to various embodiments, the application processor 200 may send, at operation 615, the storage 300 a control command providing instructions for transitioning the storage interface 330 to the first state upon expiry of a predetermined time period during which no write request to be sent to the storage 300 occurs while the storage interface 330 of the storage 300 is operating in the second state.

According to various embodiments, the storage 300 may control, at operation 617, the storage interface 330 to enter the first state in response to receiving the control command.

According to various embodiments, if the storage interface 330 enters the first state, the storage 300 may determine at operation 619 whether the function of performing the flush operation of the flash memory 310 is activated for the duration during which the storage interface 330 is operating in the first state.

According to various embodiments, the storage 300 may perform, at operation 621, the flush operation of the flash memory 310 while the storage interface 330 is in the first state, after the function of performing the flush operation of the flash memory 310 for the duration during which the storage interface 330 is in the first state is activated.

Figure 7:
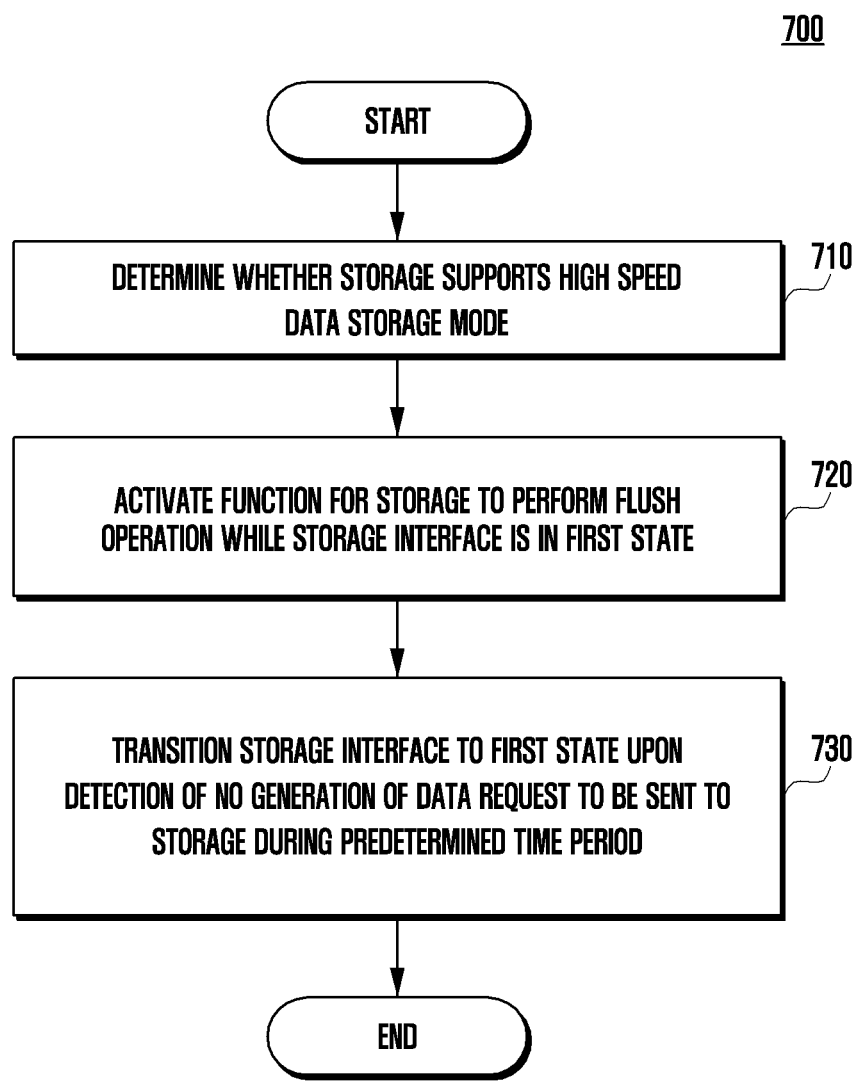
FIG. 7 is a flowchart illustrating example operations of the application processor of an electronic device according to various embodiments.

FIG. 7 is a flowchart illustrating example operations of the application processor 200 of the electronic device 101 according to various embodiments.

Referring to the flowchart 700 of FIG. 7, the application processor 200 may determine at operation 710 whether the storage 300 supports the high speed data storage mode exploiting (e.g., using) the buffer space 313 of the flash memory 310. For example, the flash memory 310 may be a non-volatile memory (e.g., non-volatile memory 134 in FIG. 1).

According to various embodiments, the application processor 200 may control, at operation 720, the storage 300 to activate a function of performing the flush operation of the flash memory 310 while the storage interface 330 is operating in the first state. For example, the flush operation may be performed in such a way of writing at least part of the data, which have been buffered in the buffer space 313 of the flash memory 310 in the SLC mode, into the storage space 315 of the flash memory 310 in the TLC mode and deleting the data written into the storage space 315 from the buffer space 313 of the flash memory 310 in the storage 300.

According to various embodiments, the application processor 200 may control, at operation 730, the storage 300 such that the storage interface 330 enters the first state upon expiry of a predetermined time period during which no data request (e.g., data write request, data read request, or data delete request) to be sent to the storage 300 occurs while the storage interface 330 of the storage 300 is operating in the second state.

Figure 8:
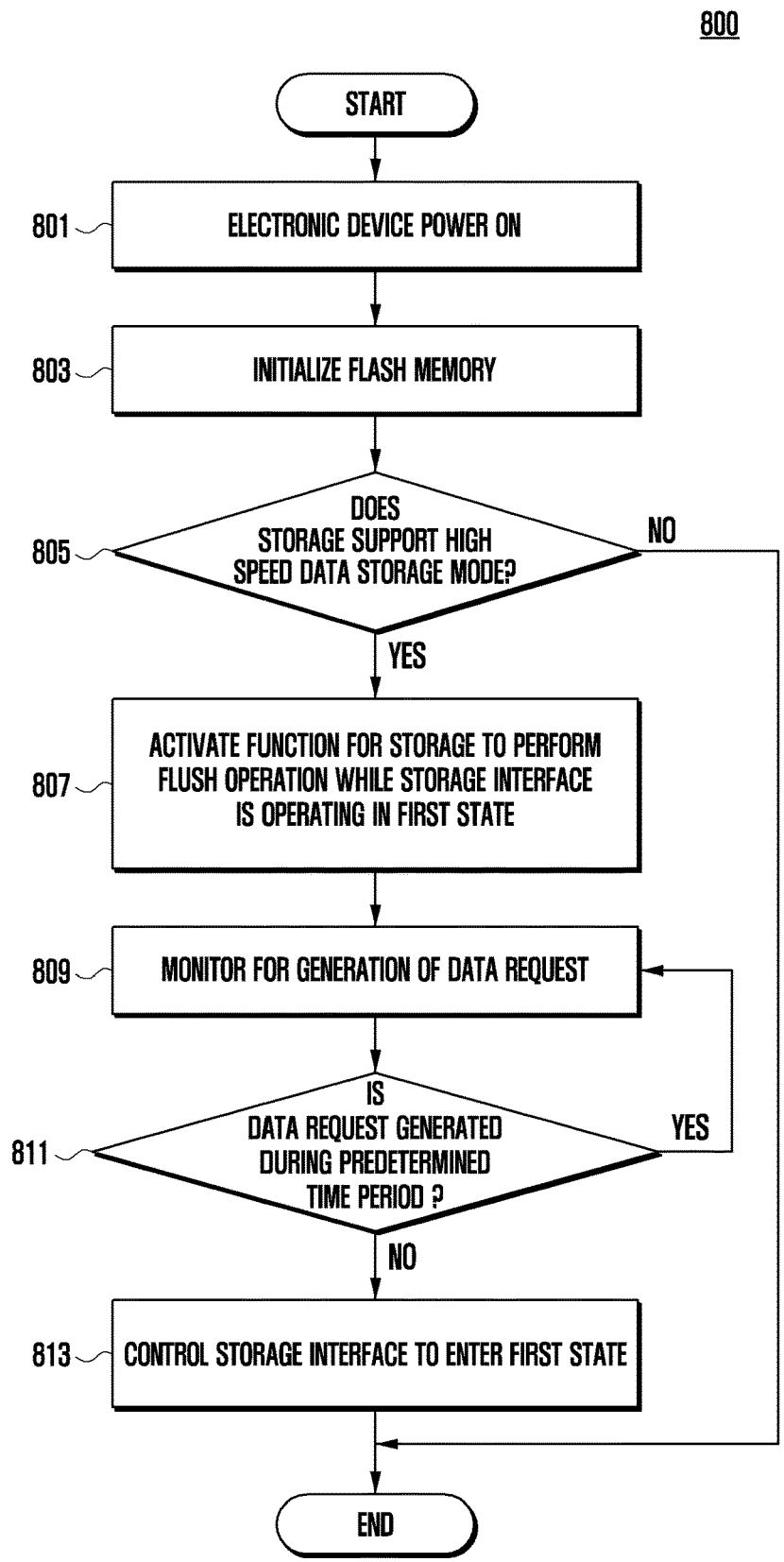
FIG. 8 is a flowchart illustrating example operations of an application processor of an electronic device according to various embodiments.

FIG. 8 is a flowchart illustrating example operations of an application processor of an electronic device according to various embodiments. The detailed descriptions overlapping with those made with reference to FIGS. 6 and 7 may not be repeated here.

Referring to the flowchart 800 of FIG. 8, the application processor 200 may power on the electronic device 101 at operation 801.

According to various embodiments, the application processor 200 may control, at operation 803, the storage 300 to initialize the flash memory 310 upon power-on of the electronic device 101. For example, the flash memory 310 may be a non-volatile memory (e.g., non-volatile memory 134 in FIG. 1). According to various embodiments, the application processor 200 may initialize at least part of the settings of the storage 300 when the electronic device exits from the power saving mode.

According to various embodiments, the application processor 200 may determine at operation 805 whether the storage 300 supports the high speed data storage mode exploiting (e.g., using) the buffer space 313 of the flash memory 310 upon completion of the initialization of the flash memory 310.

If it is determined at operation 805 that the storage 300 supports the high speed data storage mode ("Yes" at operation 805), the procedure goes to operation 807 in which the application processor 200 controls the storage 300 to activate the function of performing the flush operation for the duration during which the storage interface 330 is operating in the first state. If it is determined that the storage 300 does not support the high speed data storage mode ("No" in operation 805), the procedure ends.

According to various embodiments, the application processor 200 may monitor, at operation 809, for occurrence (e.g., generation) of a data request (e.g., data write request, data read request, or data delete request). For example, the application processor 200 may periodically check for a number of newly-occurring data write requests.

According to various embodiments, the application processor 200 may determine at operation 811 whether a new data request to be sent to the storage 300 occurs during a period during which the storage interface 330 is operating in the second state.

If it is determined that a new data request occurs during the predetermined period ("Yes" at operation 811), the procedure goes back to operation 809. If it is determined that a new data request occurs, the application processor 200 may send the data request to the storage 300.

According to various embodiments, if it is determined at operation 811 that no new data request (e.g., write request, read request, or delete request) to be sent to the storage 300 occurs during the predetermined period ("No" at operation 811), the procedure goes to operation 813 in which the application processor 200 may control the storage 300 such that the storage interface 330 enters the first state.

Figure 9:
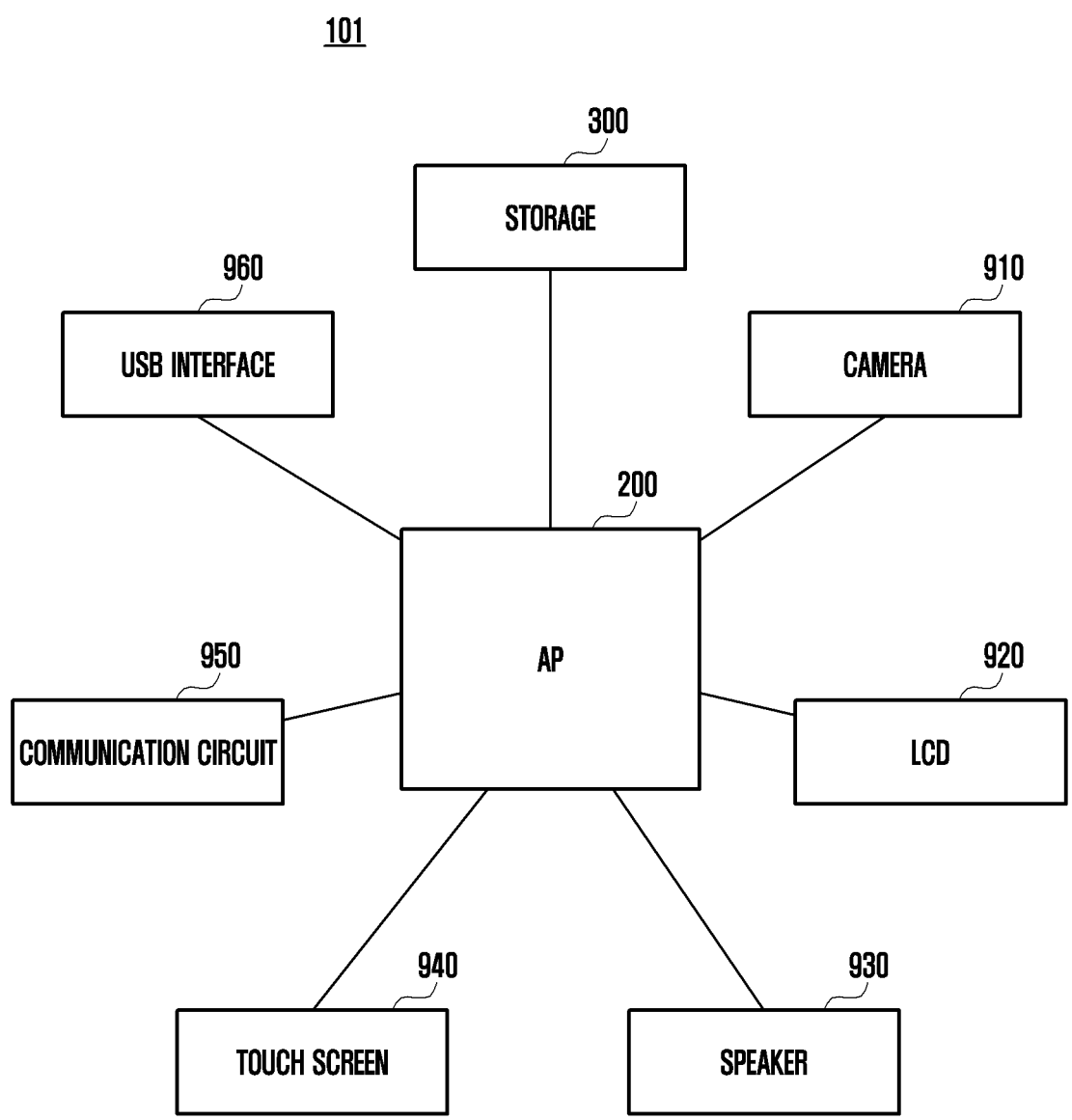
FIG. 9 is a diagram illustrating example power saving operations for components of an electronic device in a power saving mode entry procedure according to various embodiments.

FIG. 9 is a diagram illustrating example power saving operations for components of an electronic device in a power saving mode entry procedure according to various embodiments.

Referring to FIG. 9, the electronic device 101 may include an application processor 200, a storage 300, a camera 910, an LCD 920, a speaker 930, a touchscreen 940, a communication circuit 950, and/or a USB interface 960.

According to various embodiments, the application processor 200 may control the storage 300 to perform the flush operation of the flash memory 310 when the power saving operation for the storage 300 is performed in the course of the power saving mode entry procedure of the electronic device 101. The power saving mode entry procedure may be a procedure for the electronic device 101 to enter the power saving mode in such a way of performing the power saving operations for the components of the electronic device 101 in a predetermined order.

According to various embodiments, if there is no task to perform, the electronic device 101 may power off the display screen to enter the power saving mode (e.g., suspended mode or sleep mode). For example, if there is no input signal during a predetermined time period or a power-off button is pushed to turn off the touchscreen, the electronic device 101 may initiate the procedure for entering the power saving mode. If a new task is created (e.g., if a power button is pushed to turn on the display or a message is received) in the course of the procedure for entering the power saving mode, the electronic device 101 may stop the procedure for entering the power saving mode and wake up.

According to various embodiments, the procedure for the electronic device 101 to enter the power saving mode may include power saving operations for the individual components that are operationally connected with the application processor 200. Examples of the power saving operations for the components may include the operations of turning off the powers and clocks to the corresponding components and other subordinate operations. After completing the power saving operations for all of the components that are operationally connected with the application processor 200, the application processor 200 may also perform its own power saving operation to complete the power saving mode entry procedure of the electronic device 101. In the state where at least one of the power saving operations of the power saving mode entry procedure is incomplete, the electronic device 101 cannot enter the power saving mode and has to start the power saving entry mode procedure all over again.

For example, in the case where the power saving mode entry procedure of the electronic device 101 is configured to perform the power saving operations for the storage 300, the camera 910, the LCD 920, the speaker 930, the touchscreen 940, the communication circuit 950, the USB interface 960, and the application processor 200 in order, if the power saving operation for the storage 300 is incomplete, the power saving operation for the camera 910 cannot be initiated, which may cause the electronic device 101 to resume the power saving mode entry procedure all over again.

According to various embodiments, upon detection of initiation of the power saving operation for the storage 300 in the course of the power saving mode entry procedure in which the power saving operations for the individual components of the electronic device 101 are performed in order, the application processor 200 may determine whether the storage 300 supports the high speed data storage mode.

Figure 10:
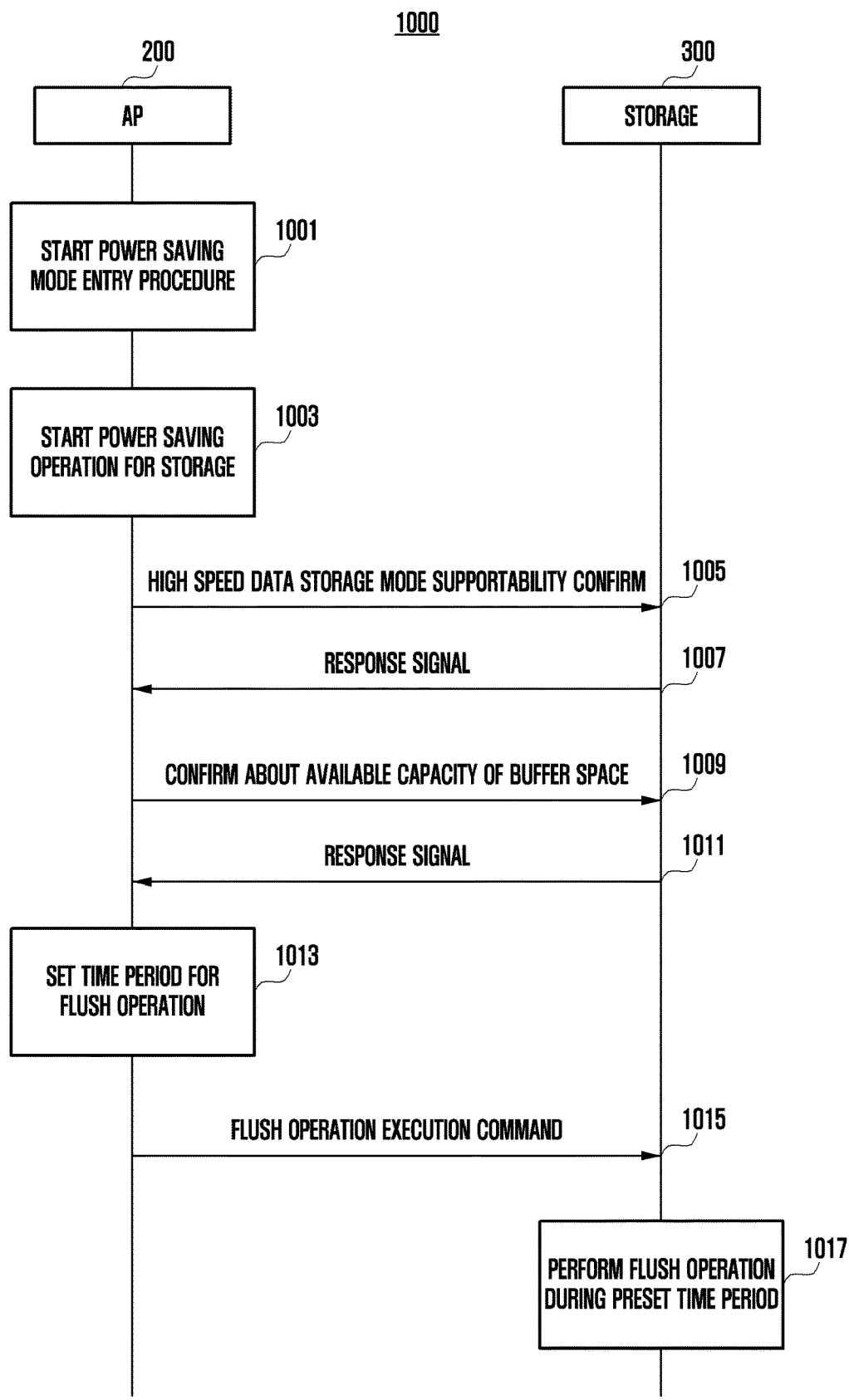
FIG. 10 is a signal flow diagram illustrating example signal flows between an application processor and a storage in an electronic device according to various embodiments.

FIG. 10 is a signal flow diagram illustrating example signal flows between an application processor and a storage in an electronic device according to various embodiments.

Referring to the signal flow diagram 1000 of FIG. 10, the application processor 200 may initiate, at operation 1001, the procedure for the electronic device 101 to enter the power saving mode. For example, the application processor 200 may initiate a power saving mode entry procedure when there is no operation for the electronic device to perform. According to various embodiments, the power saving mode entry procedure of the electronic device 101 may include power saving operations for individual components of the electronic device 101 that are operationally connected with the application processor 200.

According to various embodiments, the application processor 200 may initiate, at operation 1003, the power saving operation for the storage 300 in the course of the power saving mode entry procedure in which the power saving operations for the individual components of the electronic device 101 are performed. Examples of the power saving operations for the components may include the operations of turning off the power and clock to the storage 300.

According to various embodiments, the application processor 200 may confirm at operation 1005 whether the storage 300 supports the high speed data storage mode upon initiation of the power saving operation for the storage 300. For example, the application processor 200 may confirm whether the buffer space for the high speed data storage mode is assigned in the flash memory 310 of the storage 300. For example, the flash memory 310 may be a non-volatile memory (e.g., non-volatile memory 134 in FIG. 1).

According to various embodiments, the storage 300 may send, at operation 1007, the application processor 200 a response signal indicating whether the storage 300 supports the high speed data storage mode. For example, if some of the storage space 315 of the flash memory 310 of the storage 300 is assigned as the buffer space 313 for the high speed data storage mode, the storage 300 may send the application processor 200 the response signal including information indicating that it supports the high speed data storage mode.

According to various embodiments, the application processor 200 may confirm, at operation 1009, about an available capacity of the buffer space 313 for the high speed data storage mode in the flash memory 310 of the storage 300.

According to various embodiments, the storage 300 may send, at operation 1011, the application processor 200 a response signal including information indicating the available capacity of the buffer space 313 of the flash memory 310.

According to various embodiments, the application processor 200 may set, at operation 1013, a time period for the storage 300 to perform the flush operation of the flash memory 310 based on the available capacity of the buffer space 313. For example, the flush operation may be performed in such a way of writing at least part of the data, which have been buffered in the buffer space 313 of the flash memory 310 in the SLC mode, into the storage space 315 of the flash memory 310 in the TLC mode and deleting the data written into the storage space 315 from the buffer space 313 of the flash memory 310 in the storage 300.

According to various embodiments, the application processor 200 may send, at operation 1015, the storage 300 a control command providing instructions for performing the flush operation during the preset time period.

According to various embodiments, the storage 300 may perform, at operation 1017, the flush operation during the preset time period.

Figure 11:
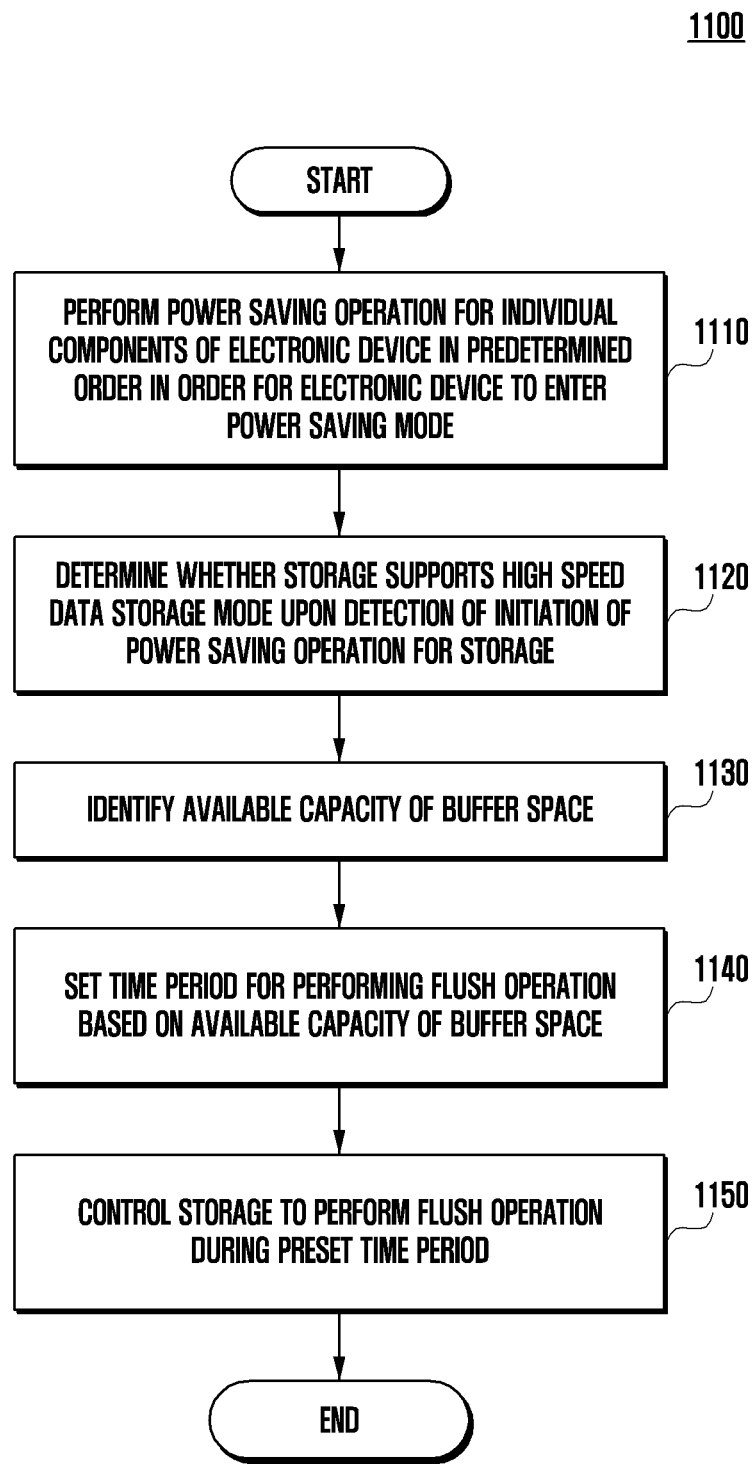
FIG. 11 is a flowchart illustrating example operations of an application processor of an electronic device according to various embodiments.

FIG. 11 is a flowchart illustrating example operations of an application processor of an electronic device according to various embodiments.

Referring to the flowchart 1100 of FIG. 11, the application processor 200 may perform, at operation 1110, power saving operations for the components (e.g., components of the electronic device 101 depicted in FIG. 9) of the electronic device 101 in a predetermined order in order for the electronic device 101 to enter the power saving mode.

According to various embodiments, the application processor 200 may determine at operation 1120 whether the storage 300 supports the high speed data storage mode upon detection of initiation of the power saving operation for the storage 300 in the course of the power saving mode entry procedure.

According to various embodiments, the application processor 200 may check, at operation 1130, for an available capacity of the buffer space 313 for the high speed data storage mode in the flash memory 310 upon detection of the fact that the storage 300 supports the high speed data wiring mode. For example, the flash memory 310 may be a non-volatile memory (e.g., non-volatile memory 134 in FIG. 1).

According to various embodiments, the application processor 200 may set, at operation 1140, a time period for the storage 300 to perform the flush operation of the flash memory 310 based on the available capacity of the buffer space 313.

According to various embodiments, the application processor 200 may control, at operation 1150, the storage 300 to perform the flush operation of the flash memory 310 during the preset time period.

Figure 12:
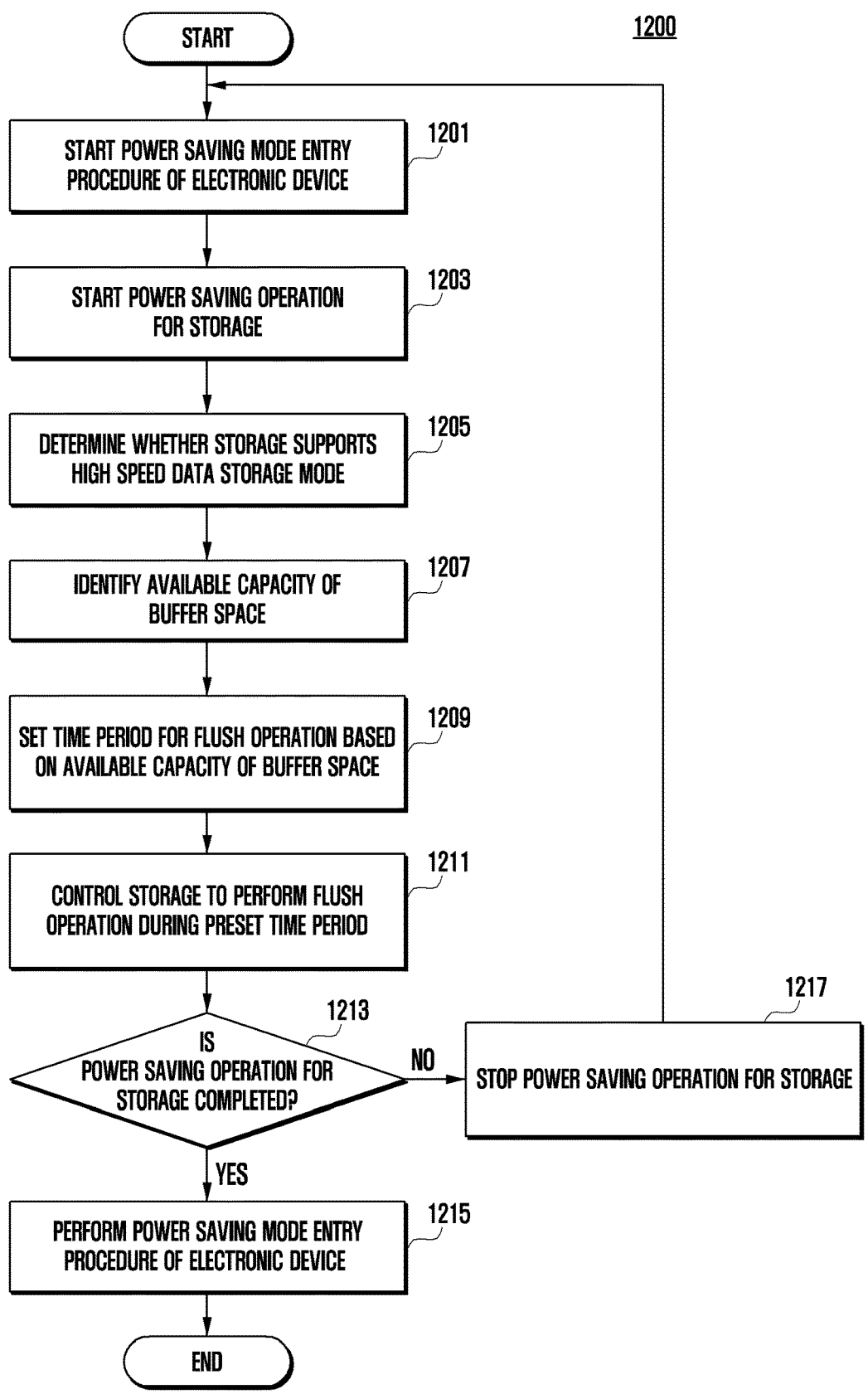
FIG. 12 is a flowchart illustrating example operations of an application processor of an electronic device according to various embodiments.

FIG. 12 is a flowchart illustrating example operations of an application processor of an electronic device according to various embodiments. The detailed descriptions overlapping with those made with reference to FIGS. 9 and 10 may not be repeated here.

Referring to the flowchart 1200 of FIG. 12, the application processor 200 may initiate a power saving mode entry procedure of the electronic device 101 at operation 1201.

According to various embodiments, the application processor 200 may perform a power saving operation at operation 1203 for the storage 300 in the course of the power saving mode entry procedure in which the power saving operations for the individual components of the electronic device 101 are performed in order.

According to various embodiments, the application processor 200 may determine at operation 1205 whether the storage 300 supports the high speed data storage mode.

According to various embodiments, the application processor 200 may check, at operation 1207, for an available capacity of the buffer space 313 for the high speed data storage mode in the flash memory 310 upon detection of the fact that the storage 300 supports the high speed data storage mode.

According to various embodiments, the application processor 200 may set, at operation 1209, a time period for the storage 300 to perform the flush operation of the flash memory 310 based on the available capacity of the buffer space 313. For example, if the available capacity of the buffer space 313 is equal to or less than a first threshold, this may determine that the storage 300 performs the flush operation of the flash memory 310 during a first time period. For example, if the available capacity of the buffer space 313 is greater than the first threshold and equal to or less than a second threshold, this may determine that the storage 300 performs the flush operation of the flash memory 310 during a second time period. For example, if the available capacity of the buffer space 313 is greater than the second threshold, this may determine that the storage 300 does not perform the flush operation of the flash memory 310.

According to various embodiments, the application processor 200 may control, at operation 1211, the storage 300 to perform the flush operation of the flash memory 310 during the preset time period.

According to various embodiments, the application processor 200 may determine at operation 1213 whether to complete the power saving operation for the storage 300 based on the available capacity of the buffer space 313. For example, if it is determined that the available capacity of the buffer space 313 is equal to or greater than the first threshold ("No" at operation 1213), the application processor 200 may control to stop, at operation 1217, the power saving operation for the storage 300, after the storage 300 completes the flush operation of the flash memory 310 during the first time period, and resume the power saving mode entry procedure all over again. For example, if it is determined that the available capacity of the buffer space 313 is greater than the first threshold and equal to or less than the second threshold ("Yes" at operation 1213), the application processor 200 may control to perform the power saving operation for the storage 300, after the storage 300 completes the flush operation of the flash memory 310 during the second time period, and proceed to perform and complete, at operation 1215, the power saving operations for other remaining components in order for the electronic device 101 to enter the power saving mode. For example, if it is determined that the available capacity of the buffer space 313 is greater than the second threshold, the application processor 200 may control to complete the power saving operation for the storage 300 immediately without the flush operation of the flash memory 310 in the storage 300 and proceed to perform and complete, at operation 1215, the power saving operations for other remaining components in order for the electronic device 101 to enter the power saving mode.

An electronic device in various example embodiments may include: a storage including a non-volatile memory having a buffer space and a storage space, a storage device controller, and a storage interface; and a processor. The processor] may be configured to perform control to: determine whether the storage supports a high speed data storage mode using the buffer space of the non-volatile memory of the storage, activate a function of writing data buffered in the buffer space of the non-volatile memory into a storage space of the non-volatile memory based on the storage interface operating in a first state based on the storage supporting the high speed data storage mode, and transition the storage interface of the storage to the first state based on no request to the storage 300 being generated during a predetermined time period during which the storage interface is operating in a second state.

In the electronic device according to various example embodiments, writing the data buffered in the buffer space into the storage space may include deleting the data written into the storage space from the buffer space.

In the electronic device according to various example embodiments, the first state of the storage interface may be a state in which the storage interface is operating in a sleep mode, and the second state of the storage interface may be a state in which the storage performs a data write operation in the high speed data storage mode based on the storage interface receiving a write request.

In the electronic device according to various example embodiments, the storage may be configured to determine whether the function is activated, based on the storage interface entering the first state, and write the data buffered in the buffer space of the non-volatile memory into the storage space of the non-volatile memory based on the storage interface operating in the first state based on the function being activated.

The electronic device according to various example embodiments may further include a battery and a power management module including various power management circuitry. The processor of the electronic device may be configured to control the power management module to supply power from the battery to the non-volatile memory based on the storage interface operating in the first state.

In the electronic device according to various example embodiments, the processor may be configured to send the storage a control command instructing the storage to activate the function based on the storage supporting the high speed data storage mode.

In the electronic device according to various example embodiments, the processor may be configured to control the storage to stop writing the data buffered in the buffer space of the non-volatile memory into the storage space based on the new write request being generated based on the storage writing the data buffered in the buffer space of the non-volatile memory into the storage space and transition the storage interface to the second state.

A storage control method of an electronic device according to various example embodiments may include: determining whether a storage supports a high speed data storage mode using a buffer space of a non-volatile memory of the storage, activating a function of writing data buffered in the buffer space of the non-volatile memory into a storage space of the non-volatile memory based on a storage interface operating in a first state based on the storage supporting the high speed data storage mode, and transitioning the storage interface of the storage to the first state based on no request to the storage being generated during a predetermined time period during which the storage interface is operating in a second state.

In the storage control method of an electronic device according to various example embodiments, writing the data buffered in the buffer space into the storage space may include deleting the data written into the storage space from the buffer space.

In the storage control method of an electronic device according to various example embodiments, the first state of the storage interface may be a state in which the storage interface is operating in a sleep mode, and the second state of the storage interface may be a state in which the storage performs a data write operation in the high speed data storage mode based on the storage interface receiving a write request.

The storage control method of an electronic device according to various example embodiments may further include controlling a power management module to supply power from a battery to the non-volatile memory based on the storage interface of the storage operating in the first state.

The storage control method of an electronic device according to various example embodiments may further include determining whether a new write request is generated based on the storage writing the data buffered in the buffer space of the non-volatile memory into the storage space, stopping writing the data buffered in the buffer space of the non-volatile memory into the storage space based on the new write request being generated based on the storage writing the data buffered in the buffer space of the non-volatile memory into the storage space, and transitioning the storage interface of the storage to the second state.

An electronic device according to various example embodiments may include: a storage including a non-volatile memory having a buffer space and a storage space, a storage device controller, and a storage interface; a touchscreen; a communication circuit; and a processor. In the electronic device according to various example embodiments, the processor may be configured to: perform power saving operations for components of the electronic device in a predetermined order, the components including the touchscreen, the communication circuit, and the storage 300, for the electronic device to enter a power saving mode, determine whether the storage supports a high speed data storage mode based on initiation of the power saving operation for the storage among the power saving operations for the components of the electronic device, identify available capacity of the buffer space for the high speed data storage mode in the non-volatile memory based on the storage supporting the high speed data storage mode, set a time period for the storage to write the data buffered in the buffer space of the non-volatile memory into the storage space of the non-volatile buffer memory based on the available capacity of the buffer space, and write the data buffered in the buffer space of the non-volatile memory of the storage into the storage space during the time period.

In the electronic device according various example embodiments, the processor is configured to determine whether the power saving operation for the storage is completed based on the available capacity of the buffer space.

In the electronic device according to various example embodiments, the processor may be configured to control the storage to perform an operation of writing the data buffered in the buffer space of the non-volatile memory into the storage space during a first time period based on the available capacity of the buffer space being equal to or less than a first threshold and, based on expiry of the first time period, stop the power saving operation for the storage and resume the power saving operations for the components of the electronic device for the electronic device to enter the power saving mode.

In the electronic device according to various example embodiments, the processor may be configured to control the storage to perform an operation of writing the data buffered in the buffer space of the non-volatile memory during a second time period based on the available capacity of the buffer space being greater than a first threshold and equal to or less than a second threshold and, based on expiry of the second time period, complete the power saving operation for the storage.

In the electronic device according to various example embodiments, the processor may be configured to perform control to complete the power saving operation for the storage without writing the data buffered in the buffer space of the non-volatile memory of the storage into the storage space based on available capacity of the buffer space being greater than a second threshold.

The electronic device according to various example embodiments may further include a battery and a power management module including power management circuitry. In the electronic device according to various example embodiments, the processor may be configured to control the power management module to supply power from the battery to the non-volatile memory based on the storage writing the data buffered in the buffer space of the non-volatile memory into the storage space.

In the electronic device according to various example embodiments, the processor may be configured to control to send a write request to the storage based on the storage writing the data buffered in the buffer space of the non-volatile memory into the storage space.

In the electronic device according to various example embodiments, the processor may be configured to control the storage to stop writing the data buffered in the buffer space of the non-volatile memory into the storage space based on a new task created in the electronic device based on the storage writing the data buffered in the buffer space of the non-volatile memory into the storage space, stop the power saving operation for the storage, and resume a procedure for the electronic device to enter the power saving mode.

As described above, the electronic device according to various example embodiments may protect against performance degradation of the electronic device and increase the available capacity of buffer space at a time point desired by a processor of the electronic device in such a way to enable the processor to set a time point to write data buffered in buffer space into storage space in a high density data storage mode, which allows the processor to check for the information on progress of the writing operation and electric current consumption caused by the writing operation.

The electronic device according to various example embodiments may also increase available capacities of buffer space and storage space for writing data in a high density data storage mode in such a way to enable the operation of writing the data buffered in the buffer space into the storage space in the high density data storage mode to be performed while a storage interface is operating in a sleep mode or in the middle of processing a procedure for the electronic device to enter a power saving mode.

The electronic device according to various example embodiments may also prevent and/or reduce an operation of writing data into storage space from degrading performance of processing a new data writing input/output request in such a way to enable the operation of writing the data buffered in the buffer space into the storage space in the high density data storage mode to be performed while a storage interface is operating in a sleep mode or in the middle of processing a procedure for the electronic device to enter a power saving mode.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand and appreciate that various changes in form and detail may be made without departing from the true spirit and full scope of the disclosure, including the appended claims and their equivalents.

What is claimed is:

1. An electronic device, comprising:
    a storage comprising a storage controller and a Universal Flash Storage (UFS) memory; and
    a chipset configured to control the storage, wherein the chipset is configured to:
        identify whether the storage supports a high speed data storage mode in which the storage controller is configured to write data to a storage space of the UFS memory through a buffer space of the UFS memory, the buffer space for storing one bit of data per memory cell and the storage space for storing a plurality of bits of data per memory cell;
        based on identifying that the storage supports the high speed data storage mode, transmit a first command to the storage to activate a flush function for flushing data from the buffer space to the storage space when a storage interface of the UFS memory is in a hibernate state,
        transmit a data write request command to the storage to cause the storage controller to write data to the buffer space in the high speed data storage mode;
        transmit a hibernate-enter command to the storage to cause the storage interface to enter the hibernate state, wherein the storage controller is configured to flush data from the buffer space to the storage space when the storage interface enters the hibernate state while the flush function is activated, and transmit a hibernate-exit command to the storage to cause the storage interface to exit the hibernate state, wherein the storage controller is configured to stop flushing data from the buffer space to the storage space when the storage interface exits the hibernate state while data is being flushed from the buffer space to the storage space.

2. The electronic device of claim 1, wherein the chipset is further configured to:

execute a power saving mode entry process comprising a sequence of power-saving operations; and control flushing of data from the buffer space to the storage space during the power-saving operations based on an available capacity of the buffer space.

3. The electronic device of claim 1, wherein the first command is a hibernate-flush command.

4. The electronic device of claim 1, wherein the chipset is further configured to transmit a flush command to the storage while the storage interface is in a state other than the hibernate state and, based on the flush command transmitted to the storage while the storage interface is in the state other than the hibernate state, the storage controller is configured to flush data from the buffer space to the storage space.

5. The electronic device of claim 1, wherein the buffer space and the storage space are different logical portions of a same UFS memory.

6. The electronic device of claim 1, wherein the chipset comprises:

a power management integrated circuit (PMIC) configured to provide power to the UFS memory when the flush function is performed.

7. The electronic device of claim 1, wherein the chipset is configured to:

control flushing of data from the buffer space to the storage space based on an available capacity of the buffer space.

8. The electronic device of claim 7, wherein a time period for flushing the data from the buffer space to the storage space is based on the available capacity of the buffer space.

9. The electronic device of claim 1, wherein the chipset is further configured to:

execute a power saving mode entry process comprising a sequence of power-saving operations including a power-saving operation for the storage; and control flushing of data from the buffer space to the storage space during the power-saving operation for the storage based on an available capacity of the buffer space.

10. The electronic device of claim 9, wherein termination of the power saving mode entry process is based on the available capacity of the buffer space.

11. The electronic device of claim 9, wherein the chipset is configured to:

based on the available capacity of the buffer space being less than or equal to a first threshold, transmit a flush command to the storage to control the storage controller to flush data from the buffer space to the storage space for a first time period; and based on the available capacity of the buffer space being greater than first threshold and less than or equal to a second threshold greater than first threshold, transmit a flush command to the storage to control the storage controller to flush data from the buffer space to the storage space for a second period of time less than the first period of time.

12. The electronic device of claim 11, wherein the chipset is configured to:

based on the available capacity of the buffer space being greater than the second threshold, generate no flush command to flush data from the buffer space to the storage space.

13. The electronic device of claim 12, wherein the identifying that the storage supports the high speed data storage mode is based on a signal transmitted by the storage to the chipset.

14. The electronic device of claim 1, wherein memory cells of the storage space comprise one of multi-level cells (MLC), triple-level cells (TLC) or quad-level cells (QLC).

15. The electronic device of claim 1, wherein the hibernate-enter command is transmitted after a predetermined time period in which no command from the chipset for accessing the UFS memory is transmitted to the storage.

16. A storage control method of an electronic device, the method comprising:

identifying whether a storage comprising a storage controller and Universal Flash Storage (UFS) supports a high speed data storage mode in which the storage controller is configured to write data to a storage space of the UFS memory through a buffer space of the UFS memory, the buffer space for storing one bit of data per memory cell and the storage space for storing a plurality of bits of data per memory cell;

based on identifying that the storage supports the high speed data storage mode, transmitting a first command to the storage to activate a flush function for flushing data from the buffer space to the storage space when a storage interface of the UFS memory is in a hibernate state;

transmit a data write request command to the storage to cause the storage controller to write data to the buffer space in the high speed data storage mode;

transmitting a hibernate-enter command to the storage to cause the storage interface to enter the hibernate state, wherein the storage controller is configured to flush data from the buffer space to the storage space when the storage interface enters the hibernate state while the flush function is activated; and transmitting a hibernate-exit command to the storage to cause the storage interface to exit the hibernate state, wherein the storage controller is configured to stop flushing data from the buffer space to the storage space when the storage interface exits the hibernate state while data is being flushed from the buffer space to the storage space.

17. A chipset for controlling a storage comprising a storage controller and a Universal Flash Storage (UFS) memory, the chipset comprising:

a processor; and a memory storing instructions that, when executed by the processor, cause the chipset to:

identify whether the storage supports a high speed data storage mode in which the storage controller is configured to write data to a storage space of the UFS memory through a buffer space of the UFS memory, the buffer space for storing one bit of data per memory cell and the storage space for storing a plurality of bits per memory cell;

based on identifying that the storage supports the high speed data storage mode, transmit a first command to the storage to activate a flush function of the storage controller for flushing data from the buffer space to the storage space when a storage interface of the UFS memory is in a hibernate state;

transmit a data write request command to the storage to cause the storage controller to write data to the buffer space in the high speed data storage mode;

transmit a hibernate-enter command to the storage to cause the storage interface to enter the hibernate state, wherein the storage controller is configured to flush data from the buffer space to the storage space when the storage interface enters the hibernate state while the flush function is activated; and transmit a hibernate-exit command to the storage to cause the storage interface to exit the hibernate state, wherein the storage controller is configured to stop flushing data from the buffer space to the storage space when the storage interface exits the hibernate state while data is being flushed from the buffer space to the storage space.

18. The chipset of claim 17, wherein the first command is a hibernate-flush command.

19. The chipset of claim 17, wherein the instructions further cause the chipset to transmit a flush command to the storage while the storage interface is in a state other than the hibernate state to cause the storage controller to flush data from the buffer space to the storage space.

20. The chipset of claim 17, wherein the buffer space and the storage space are different logical portions of a same UFS memory.

21. The chipset of claim 17, further comprising:
a power management integrated circuit (PMIC) configured to provide power to the UFS memory when the flush function is performed.

22. The chipset of claim 17, wherein the instructions further cause the chipset to:
control flushing of data from the buffer space to the storage space based on an available capacity of the buffer space.

23. The chipset of claim 22, wherein a time period for flushing the data from the buffer space to the storage space is based on the available capacity of the buffer space.

24. The chipset of claim 17, wherein the instructions further cause the chipset to:
execute a power saving mode entry process comprising a sequence of power-saving operations including a power-saving operation for the storage; and
control flushing of data from the buffer space to the storage space during the power-saving operation for the storage based on an available capacity of the buffer space.

25. The chipset of claim 24, wherein termination of the power saving mode entry process is based on the available capacity of the buffer space.

26. The chipset of claim 24, wherein the instructions further cause the chipset to:
based on the available capacity of the buffer space being less than or equal to a first threshold, transmit a flush command to control the storage controller to flush data from the buffer space to the storage space for a first time period; and
based on the available capacity of the buffer space being greater than first threshold and less than or equal to a second threshold greater than first threshold, transmit a flush command to control the storage controller to flush data from the buffer space to the storage space for a second period of time less than the first period of time.

27. The chipset of claim 26, wherein the instructions further cause the chipset to:
based on the available capacity of the buffer space being greater than the second threshold, generate no flush command to flush data from the buffer space to the storage space.

28. The chipset of claim 17, wherein the identifying that the storage supports the high speed data storage mode is based on a signal received by the chipset from the storage.

29. The chipset of claim 17, wherein memory cells of the storage space comprise one of multi-level cells (MLC), triple-level cells (TLC) or quad-level cells (QLC).

30. The chipset of claim 17, wherein the hibernate-enter command is transmitted after a predetermined time period in which no command from the chipset for accessing the UFS memory is transmitted to the storage.

31. An electronic device comprising the chipset of claim 17.

32. A non-transitory computer-readable storage medium storing instructions for controlling a storage comprising a storage controller and a Universal Flash Storage (UFS) memory, the instructions, when executed by a processor of a chipset, cause the chipset to:
identify whether the storage supports a high speed data storage mode in which the storage controller is configured to write data to a storage space of the UFS memory through a buffer space of the UFS memory, the buffer space for storing one bit of data per memory cell and the storage space for storing a plurality of bits per memory cell;
based on identifying that the storage supports the high speed data storage mode, transmit a first command to the storage to activate a flush function of the storage controller for flushing data from the buffer space to the storage space when a storage interface of the UFS memory is in a hibernate state;
transmit a data write request command to the storage to cause the storage controller to write data to the buffer space in the high speed data storage mode;
transmit a hibernate-enter command to the storage to cause the storage interface to enter the hibernate state, wherein the storage controller is configured to flush data from the buffer space to the storage space when the storage interface enters the hibernate state while the flush function is activated; and
transmit a hibernate-exit command to the storage to cause the storage interface to exit the hibernate state, wherein the storage controller is configured to stop flushing data from the buffer space to the storage space when the storage interface exits the hibernate state while data is being flushed from the buffer space to the storage space.

* * * * *